United States Patent [19]
Blount

[11] Patent Number: 6,145,482
[45] Date of Patent: Nov. 14, 2000

[54] ROTARY-RECIPROCAL COMBUSTION ENGINES

[76] Inventor: David H. Blount, 6728 Del Cerro Blvd., San Diego, Calif. 92120

[21] Appl. No.: 09/085,967

[22] Filed: May 27, 1998

[51] Int. Cl.[7] .................................................. F02B 53/00
[52] U.S. Cl. ............................................ 123/45 A; 418/68
[58] Field of Search ............................... 123/45 A, 45 R; 418/68; 92/33

[56] References Cited

U.S. PATENT DOCUMENTS 1,229,438  6/1917  French .................................... 123/45 R
4,090,478  5/1978  Trimble et al. ............................. 92/33

FOREIGN PATENT DOCUMENTS 132990   11/1978  Germany .
13677    8/1916   United Kingdom .

*Primary Examiner*—Thomas Denion
*Assistant Examiner*—Tu M. Nguyen

[57] ABSTRACT

This invention relates to an apparatus for producing a rotary motion force, using an internal combustion engine, rotary-reciprocal type, consisting of a housing, a piston, a rotor, a shaft, a rotary reciprocal guiding system, fuel intake system and an ignition system. This rotary reciprocal engine is an improvement over known engines of this type, because it has a longer expansion and suction strokes, and a shorter compression and exhaustion strokes, thereby producing more rotary motion per ignition. This internal combustion engine has many uses which are commonly known, but this apparatus may also be used as a compressor, as a pump, as an engine, powered by an expanding heating liquid or gas, or a combination of the above.

23 Claims, 18 Drawing Sheets

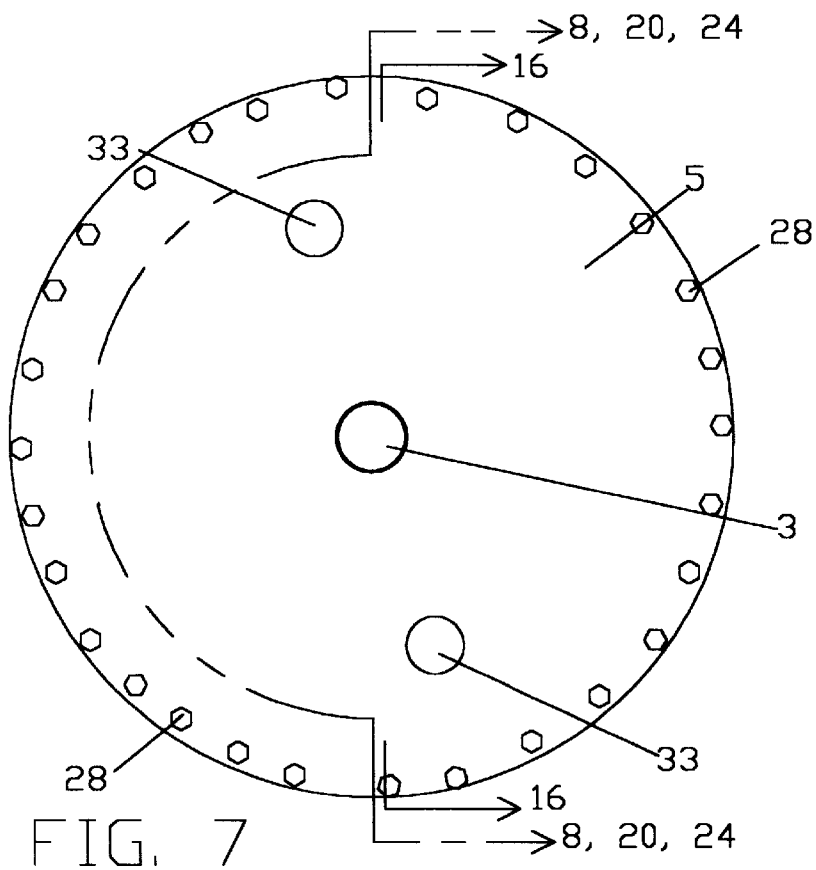
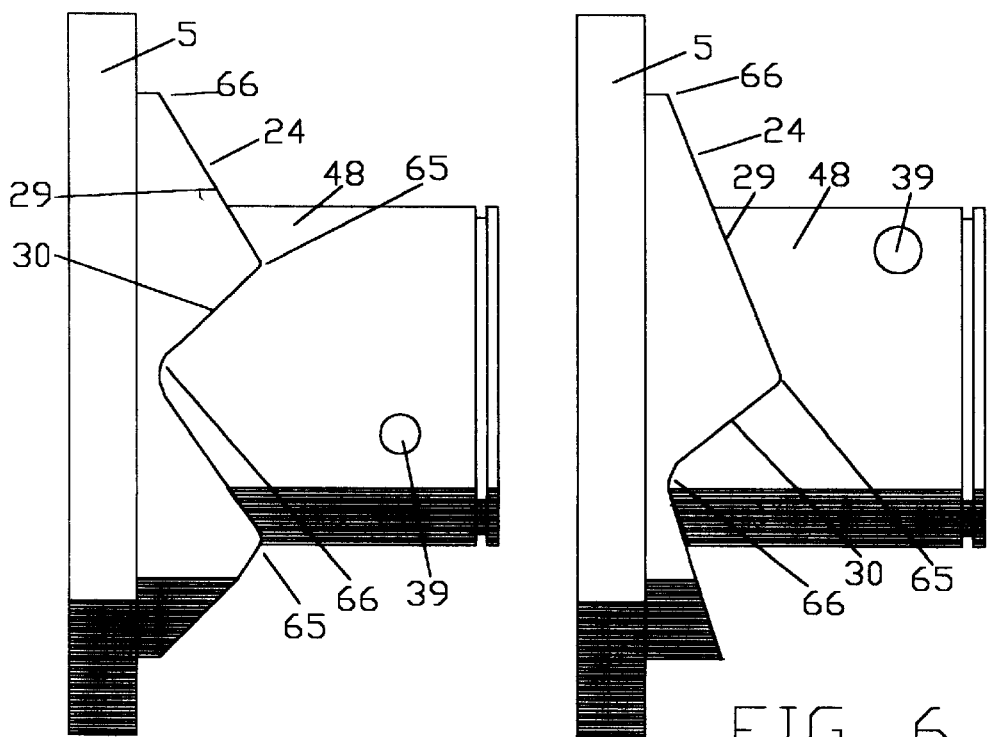

ROTARY-RECIPROCAL COMBUSTION ENGINES

CROSS REFERENCE TO RELATED U.S. PATENTS

This application is an improvement over Blount's U.S. Pat. Nos. 5,152,257; 5,156,115; 5,301,637 and 5,433,176. The improvement is the novel design which has a longer expansion stroke than the compression stroke thereby producing more rotary motion per ignition.

BACKGROUND OF THE INVENTION

The invention relates to an apparatus for producing a rotary motion force by using an internal combustion engine of the rotary-reciprocal type, provided with a piston which has a circular shape. The piston is rotary and reciprocally mounted on a centrally located engine rotor, which is connected to the shaft in a fixed housing having a cavity formed by a circular peripheral wall and two side walls.

Many rotary engines have been invented in the past such as the Agostino Ramelli's water pump, James Watts-rotary steam engine, Gilbert's engine, Cooley's engine, Delwood engine, Wankel engine, Walter engine, Farwell engine, Mercer engine, Porsche rotary engines, Virmel engine, Kauert engine, Jemals, Geiger engine, Franke engine and others.

The improved engine of this invention is of the novel rotary-reciprocal type, wherein the circular piston reciprocates on the centrally located engine rotor while rotating the engine shaft. The rotary and reciprocal motion is guided by a rotary and reciprocal guide. The engine of this invention is entirely different from the known rotary-reciprocal type engine, because it is designed to have a longer rotating expansion stroke than a rotating compression stroke thereby producing more rotation per ignition. It also has two or more sealed combustion chambers.

The present novel rotary-reciprocal apparatus of this invention may be utilized as an internal combustion engine, as a combination of an internal combustion engine and a compressor and/or pump, as a steam engine, as a pump and as a gas compressor, as an engine powered by expanding heated liquids or gases.

The basic rotary-reciprocal internal combustion engine of this invention consist of stationary cylindrical housing having a laterally and peripherally placed cylinder chambers, a central chamber or a compression chamber and a posterior compression chamber, a peripherally placed circular piston with a centrally located hub on the posterior wall, a rotor on which the piston reciprocate and rotates with, the rotor is attached to a centrally located engine shaft and the rotor's peripheral area consisting of a non-round (square, hexagon, triangular, etc.) shape, the shaft's round ends protrude out the center of the housing's side walls, a reciprocal and rotary guiding system, an ignition system, a gases mixture intake port and an exhaust port. The housing's chambers are separated by the piston and closed by means of rings and seals on the piston. The cylinder chambers vary in sizes when the piston rotates and reciprocates thereby the strokes of suction, compression, ignition and exhaustion takes place in the cylinder chambers.

The apparatus of this invention is relatively simple in construction and operation whereby the engine can be produced at relatively low cost Fewer parts are required in its construction when compared with conventional engines. This new engine design with the improvement of long rotary expansion strokes and short rotary compression stroke should improve the efficiency of the engine's operation and are extremely desirable.

SUMMARY OF THE INVENTION

The object of the present invention is to produce an improved internal combustion engine, which is of the rotary-reciprocal type with a longer rotary expansion stroke than the rotary compression stroke. Another object is to provide a novel apparatus which is a rotary-reciprocal internal combustion engine, which also has chambers for compressing a gas and/or pumping fluid. Another object is to produce an apparatus which may be utilized as a two cycle rotary-reciprocal internal combustion engine or as a four cycle rotary-reciprocal internal combustion engine. Another object is to produce an apparatus which has the strokes of suction, compression, ignition and exhaustion. Still another object is to produce multiple arrangement of the rotary-reciprocal Internal combustion engine of this invention. Another object is to produce an apparatus which may be utilized as a compressor, as a pump, and as an engine powered by the expansion of heated gases or liquids.

The two cycle and four cycle rotary-reciprocal internal combustion engine of this invention consist of:

1. Housing, a stationary hollow cylindrical housing having a circular cavity, which is divided into 3 cavities, a laterally and peripherally placed cylinder chamber, which is formed with walls consisting of the inner surface of the peripheral housing wall, the partial inner circular wall which is attached to one side wall of the housing, and extends parallel with the peripheral wall of the housing toward the center of the housing, leaving room in the housing for the piston to rotate and reciprocate, and the inner surface of the side wall (front) of the housing; this side wall has equally spaced arcuate recesses, which has a longer surface for the expansion stroke and a shorter surface for the compression stroke, projecting into the cylinder chamber. The housing has passage ways for admitting a gaseous mixture to the cylinder chamber, and passage ways for discharging combustion gases from the cylinder chamber. Compression chambers are formed in the posterior and anterior central area of the housing. These chambers are separated from each other by means of the piston and closed by rings on the piston. There are one or more spark plug ports in arcuate recesses of the housing and opens into the cylinder chambers.

2. Piston, consisting of laterally and peripheral located circular piston with thick peripheral wall and hallow center. The piston's side wall (front) has equally spaced waves which matches, in shape and number, the arcuate recesses in the cylinder chamber side wall (front) and are at 90 degree to the peripheral wall of the piston. The portion of the wave for expansion is longer than the portion of the wave for compression. The piston's posterior side wall extends down centrally and has a hub with an non-round (square, triangular, hexagon, etc.) opening for the engine's rotor. The piston for two and four cycle engines has an open passage way from the compression chamber through the piston and communicates with the cylinder chambers. The piston has rings around the peripheral wall and inner circular wall or inner extended wall which seals housing chambers. The cylinder chambers are further divided to form 2 or more cylinder chambers by means of seals which are located on the crest of the waved piston side wall (front) to form chambers for intake, compression, ignition and exhaustion. The piston is rotary and reciprocally mounted in the housing on an engine rotor. Balance weights may be added to the rotor especially when only one spark plug is fired thereby giving an uneven pressure on the piston.

3. Engine's rotor and shaft, consisting of a central non-round portion (square, hexagon, triangular, etc.) or a round rotor with slots for pins and is mounted in the center of the circular housing cavity, the rotor passing thru the posterior wall of the piston and is attached to or part of the shaft The engine's rotor has means for the piston to reciprocated on the engine's rotor while rotating with the rotor and shaft. The shaft passes through the side walls and has means for gears, pulleys, other engines, etc. to attach to the round portion of the engine shaft.

4. Rotary-reciprocal guide, consisting of a stationary round metal or bearing attached to the housing and a waved rotary reciprocal guide groove located on the peripheral surface of the piston. The waved side walls of the groove matches, in number and shape, the waved piston's side wall and the arcuate recesses of the cylinder side wall. The rotary-reciprocal guide, guides the piston in the housing while keeping the piston's rings and seals in continuous contact with the cylinder chamber's walls and varying the volume of the cylinder chambers enabling a compression of a gaseous mixture to take place after admitting a gaseous mixture to the cylinder chamber.

5. Ignition system, consisting of means for ignition of compressed gaseous mixture for expansion of cylinder chambers due to pressure on the piston from the combustion products.

6. Fuel system, consisting of means to supply fuel and air to the cylinder combustion chambers. The fuel system may consist of a carburetor to supply the air and fuel to the cylinder combustion chambers or the air may be passed from the posterior compression chamber to the cylinder combustion chamber and the fuel injected into the cylinder combustion chambers.

The basic engine components of the engine of this invention may be used in a two cycle or a four cycle engine or in a double two cycle or four cycle engine. The two cycle engine's intake and exhaust ports are located in a position where the expanded combustion gases escape when the cylinder chamber has expanded to its maximum, whereas in a four cycle engine the intake and exhaust ports are located in the area where cylinder chamber is the smallest so the fuel-air mixture can be drawn in when the cylinder chamber expands, the the expanded combustion gases can be pushed out as the cylinder chambers becomes smaller. The two cycle engine may have one cylinder chamber or the cylinder chamber may be divided into two or more chambers by means of adding equally spaced and an equal number of waves to piston wall and equally spaced, equal shape and equal numbers of arcuate recesses to housing's wall, and adding seals to the crest of each wave on the piston and rings on the piston. Each cylinder chamber is furnished with an intake port, exhaust port and ignition means. The four cycle engine requires that the cylinder chamber be divided into two or more chambers, wherein one of the chambers is for ignition, of compressed fuel-air mixture, and the other chamber is for exhaustion of exhaust gases. When the compressed mixture is ignited and this one chamber expands by the heated gas pressure while the other chamber draws in a fuel-air mixture by it being expanded. In four cycle engines, every other chamber has an ignition system.

A double rotary-reciprocal internal combustion engine of the two cycle or four cycle type is produced by attaching together the housing of one engine with the housing of another engine, back to back and mounting the piston of both engines on one long rotor and shaft, with the pistons of the two engine back to back. One piston is mounted to where the waves of the rotor fits into the arcuate recesses in the housing's wall on one side and on the other side the crest of the waves are mounted where they are opposite to the maximum recessed area of the arcuate recesses of the housing's wall, then the rotor-reciprocal guide are placed in the guide grooves to keep the pistons in the right position. When a double two cycle engine is to be made two cycle engines are utilized. When a double four cycle engine is to be made two four cycle engines are utilized.

The cylinder chamber may be divided into more than two cylinder chambers. More than one of the cylinder chambers may have a spark plug or spark plugs which are fired at the same time. In two cycle rotary-reciprocal engine each cylinder chamber is furnished with a spark plug and is fired simultaneously. When there is one or two cylinder chambers in this two cycle engine there is one ignition every 180 degrees of rotation. When there are two cylinder chambers in the four cycle rotary-reciprocal engine there is a spark plug for every other cylinder chamber and there is one ignition every 180 degrees of rotation. When there are 3 cylinder chambers in the two cycle rotary-reciprocal engine there are 3 sparks plugs that fire simultaneously, and there is an ignition every 120 degree of rotation. In a 3 cylinder chambers, four cycle engine there is one spark plug. The spark plug is fired twice per 360 degree of rotation, and one of the cylinder chambers are utilized to compress the gaseous mixture for the second time. In a 2 cycle, 4 cylinder chambers, rotary-reciprocal engine there is a spark plug for each cylinder chamber and they fire simultaneously every 90 degrees of rotation. In a 4 cycle, 4 cylinder chambers, rotary-reciprocal engine there is a spark plug for every other cylinder and, they fire simultaneously every 90 degrees of rotation. In a 6 cylinder chambers, rotary-reciprocal engine there is an ignition every 60 degree of rotation. Odd numbers of cylinder chambers may be utilized in 2 cycle rotary-reciprocal engines.

The compression ratio and the reciprocal stroke is controlled by the design of the waved sides of the piston's rotary-reciprocal guide which also dictates the design of the arcuate recesses in the cylinder chamber side wall, and the piston waved side wall, because the three must have the same pattern in order for the piston seals to constantly engage the inner surface of the cylinder chamber walls. The compression ratio and the reciprocal stroke may be designed as desired.

A pattern for the design of the waved and arcuate recessed surfaces is made by measuring the circumference of the peripheral surface of the piston of the desired diameter, then measure that distance in a straight line on a pattern. Divide that line into equal parts, equal to the amount of cylinder chambers desired, these points are the crest of the wave. Then measuring clockwise the desired distant for the long expansion stroke between the crest of the waves, and that is the trough of the wave, then measure the distant from the trough to the next crest of the wave which is the shorter compression stroke. The crest of the wave are where the seals are located. Now draw a curved line connecting trough points, with the crest points thereby producing the pattern for the waves of the piston and arcuate recesses of the housing.

The fuel systems for this rotary-reciprocal engine may be selected from a fuel pump-carburetor system, direct injection system or an air-assisted fuel system or any other desirable means. In a 2 cycle rotary-reciprocal engine the gaseous mixture may enter into a compression chamber which communicates with the cylinder chamber or only compressed air enters into the cylinder chambers from the compression chamber, and the fuel is directly Injected or air-assisted injected into the cylinder chambers. In a 4 cycle engine of this invention the gaseous mixture aspirated from a carburetor or into the cylinder chambers or the air may be aspirated in, and the fuel directly injected or air-assisted injected into the cylinder chambers utilizing compressed air from the compression chamber. Any suitable fuel may be utilized in the engines of this invention, suitable fuel include but are not limited to organic gases, liquid and powder such as petroleum fuel, e.g. gasoline, other petroleum organic gases e.g., methane, ethane, propane, butane, carbide, etc., alcohols, e.g., methanol, ethanol, propanol, etc., hydrogen, coal powder mixed with flammable gases or liquids. Gasoline is the preferred fuel.

The ignition system for this rotary-reciprocal engine may consist of any-suitable method to ignite the fuel in the combustion cylinder chambers by means of an electrical spark or heat. The preferred ignition system is that commonly utilized in automobiles consisting of a storage battery, generator or alternator, and a timing device such as a distribution on an electronic timing device which are connected by wires to the spark plugs.

The cooling system of this rotary-reciprocal engine may be cooled by means of a liquid cooling system, by an air cooling system on by a combination of these two systems. In the liquid cooling system the coolant is pumped into chambers around the walls of the cylinder chambers then to a radiaton for cooling then back to the engine. Cooling fins may be made into the walls of the cylinder chambers and cooled by air. Air also is utilized from the compression chamber to cool the inside of the rotor's piston, and this heated compressed air may be utilized in the gaseous mixture which communicates with the cylinder chambers.

The rotor may have a balance weight added to the rotor on attached to the engine shaft. In engine with more than two spark plugs which are opposite to each other the ignition force is balanced by when only one spark plug is used as in a 4 cycle, 2 cylinder chambers engine.

DESCRIPTION OF THE DRAWINGS

Other objects of the invention will become apparent upon reading the annexed detail description in connection with the drawing in which:

FIG. 5 is a plan view of the head of a 4 cycle, 4 cylinder chambers, rotary-reciprocal engine.

FIG. 6 is a plan view of the head of a 2 cycle, 3 cylinder chambers, rotary-reciprocal engine.

FIG. 7 is a front view of a 2 cycle, 2 cylinder chambers, rotary-reciprocal engine or a double 2 cycle, 2 chambers, rotary-reciprocal engine.

Figure 12:
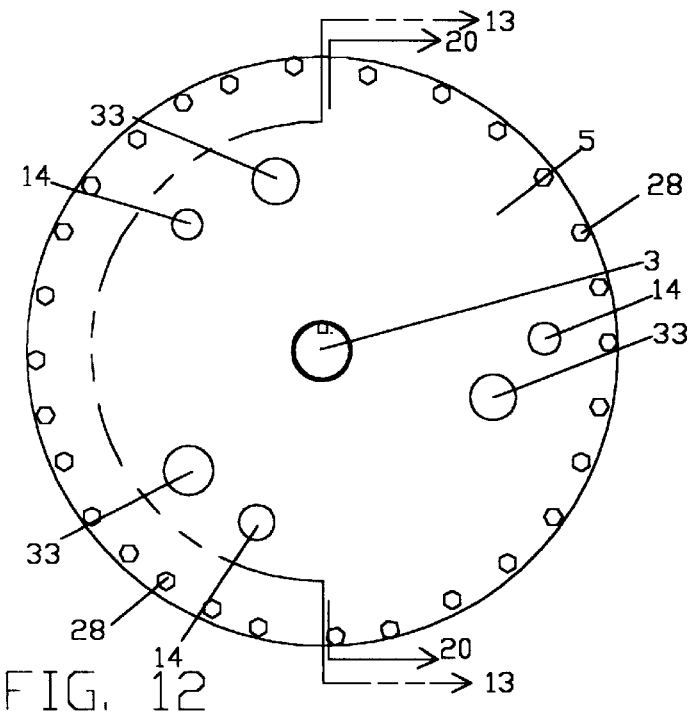
FIG. 12 is a frontal view of a 2 cycle, 3 cylinder chambers, engine with fuel injection or a double 2 cycle, 3 cylinder chambers, rotary-reciprocal engine.

FIG, 13 is a sectional view of a 2 cycle, 3 cylinder chambers, engine with fuel injection, taken along lines 13—13 of FIG. 12.

Figure 1:
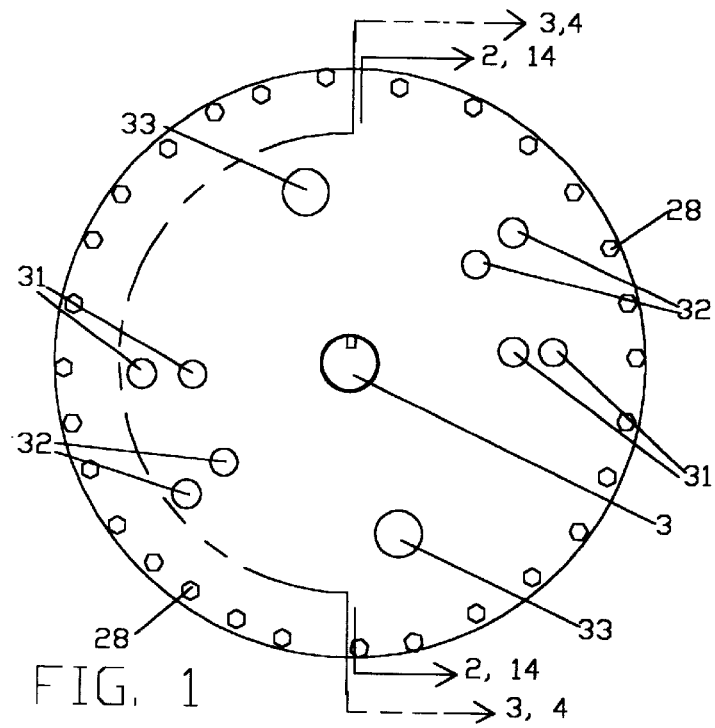
FIG. 1 is a front view of a 4 cycle, 4 cylinder chambers, rotary-reciprocal engine on a double 4 cycle, 4 cylinder chambers, rotary-reciprocal engine.
Figure 14:
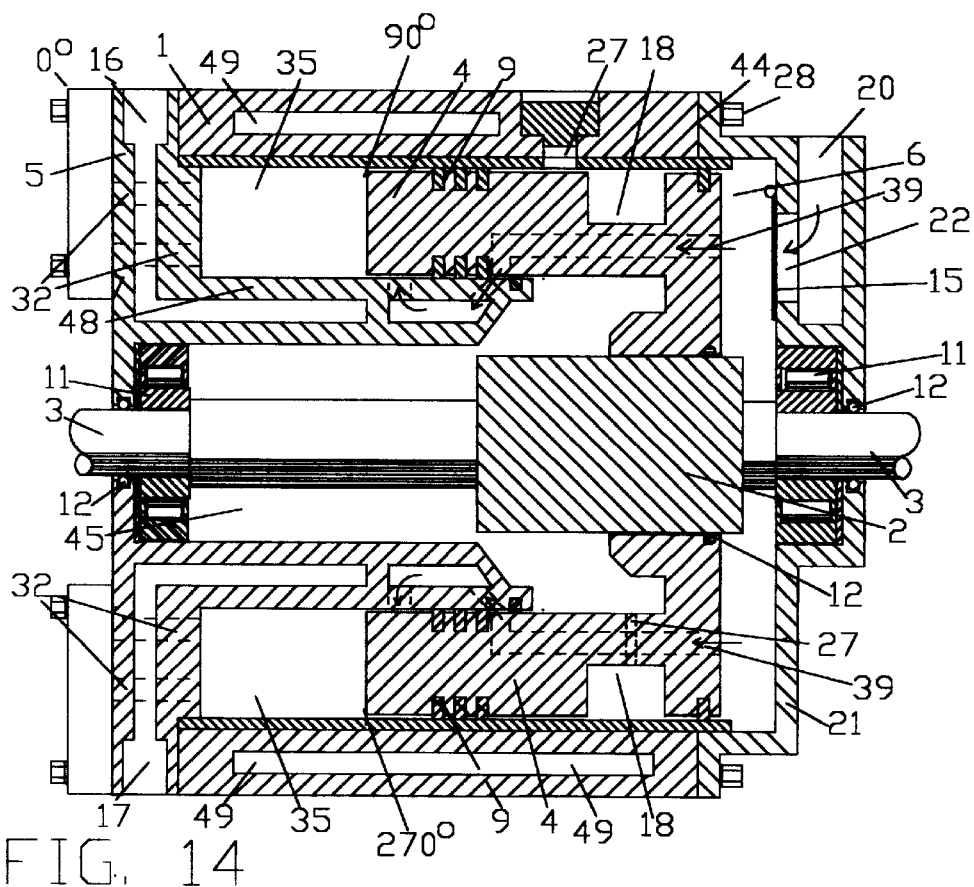

FIG. 14 is a cross section of a 4 cycle, 4 cylinder chambers, rotary-reciprocal engine with piston at end of the expansion stroke, taken along the lines 14—14 of FIG. 1.

Figure 15:
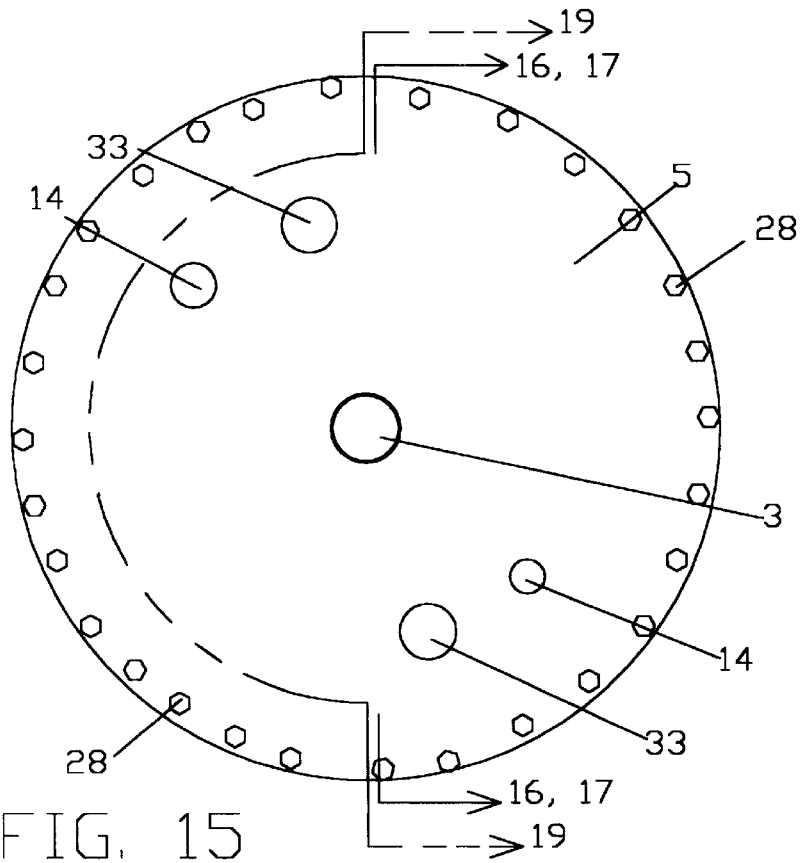

FIG. 15 is a frontal view of a 2 cycle, 2 cylinder chambers, engine with fuel injection or a double 2 cycle, 2 cylinder chambers, rotary-reciprocal engine.

Figure 16:
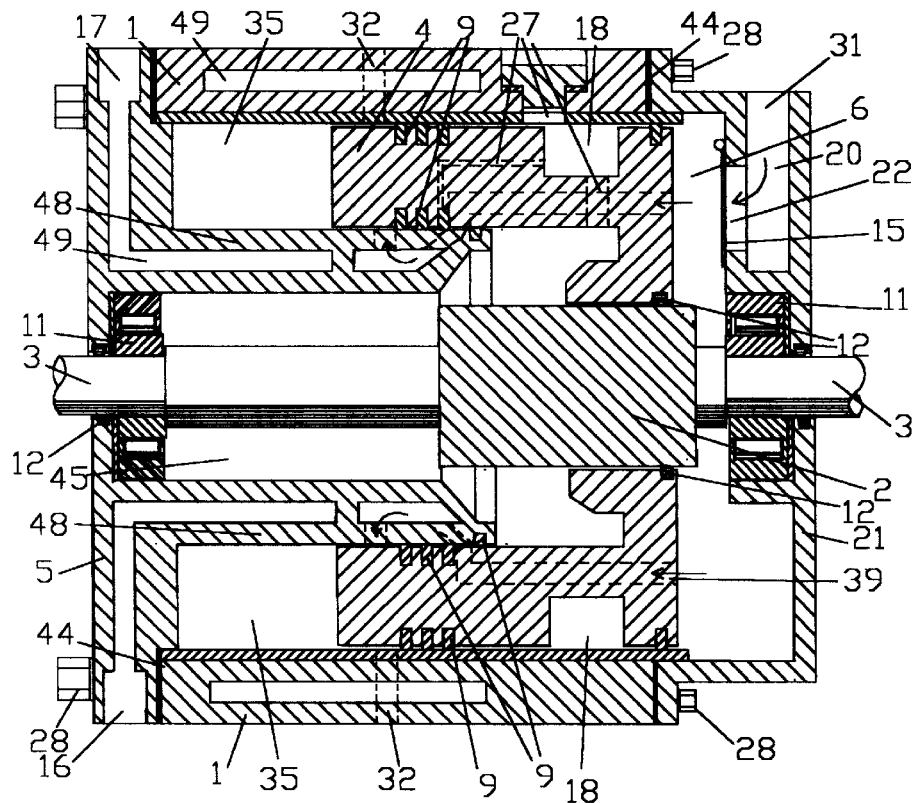

FIG. 16 is a cross section view of a 2 cycle, 2 cylinder chambers, rotary-reciprocal engine with piston at the end of the expansion stroke, taken along the lines of 16—16 of FIG. 15.

Figure 17:
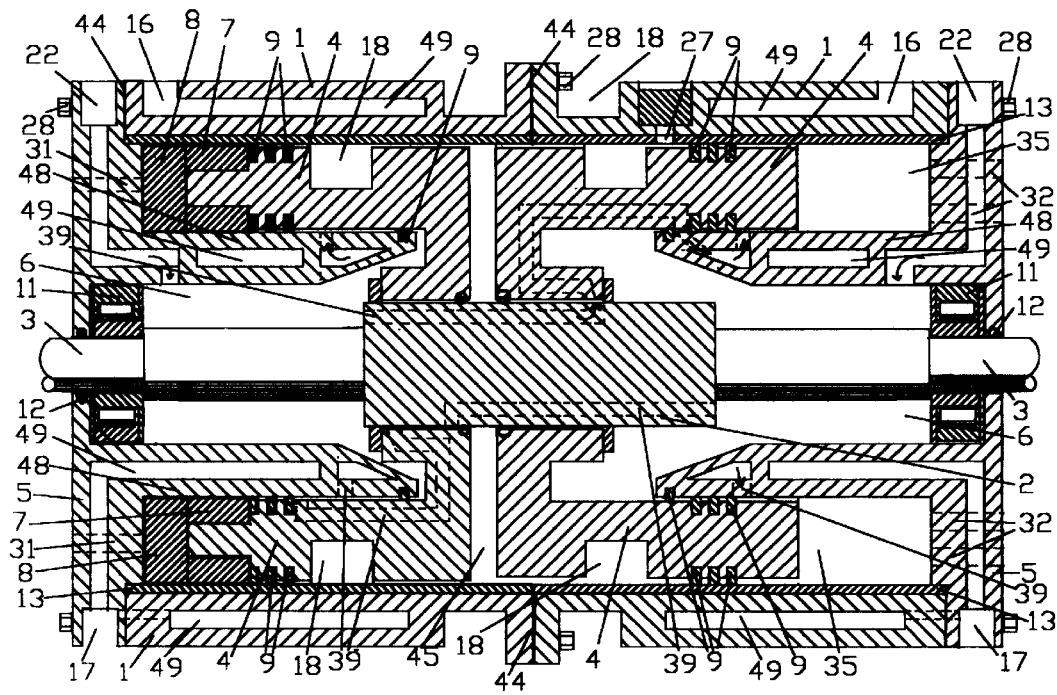

FIG. 17 is a cross section view of a 2 cycle, 2 cylinder chamber, double rotary-reciprocal engine or a 4 cycle, 4 cylinder chamber, engine or a 4 cycle, 6 cylinder chambers, line taken along the lines of 17—17 of FIG. 15.

Figure 18:
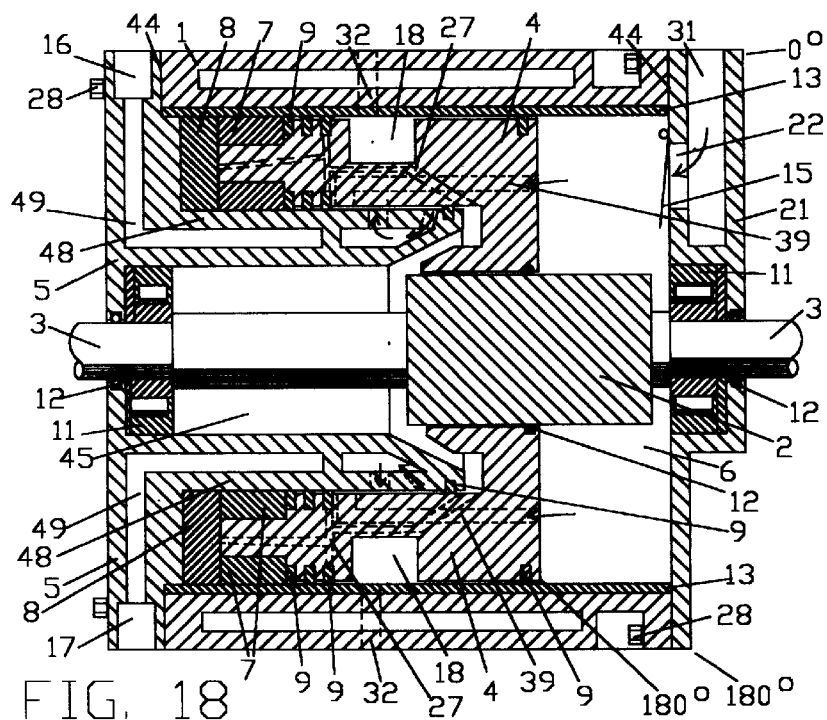

FIG. 18 is a cross section view of a 2 cycle, 2 cylinder chambers, rotary-reciprocal engine taken along the lines of 18—18 of FIG. 15 or a 2 cycle, 4 or 6 chambers, engine.

Figure 19:
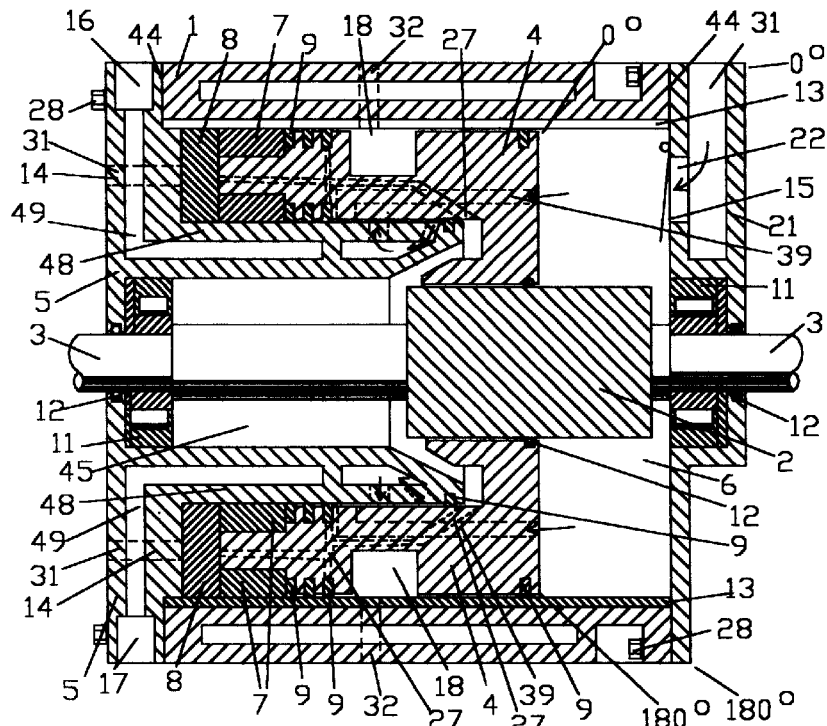

FIG. 19 is a cross section view of a 2 cycle, 2 cylinder chambers, engine with fuel injection, taken along lines 19—19 of FIG. 15 or a 2 cycle, 4, 6 or 8 cylinder chambers, rotary-reciprocal engine.

Figure 20:
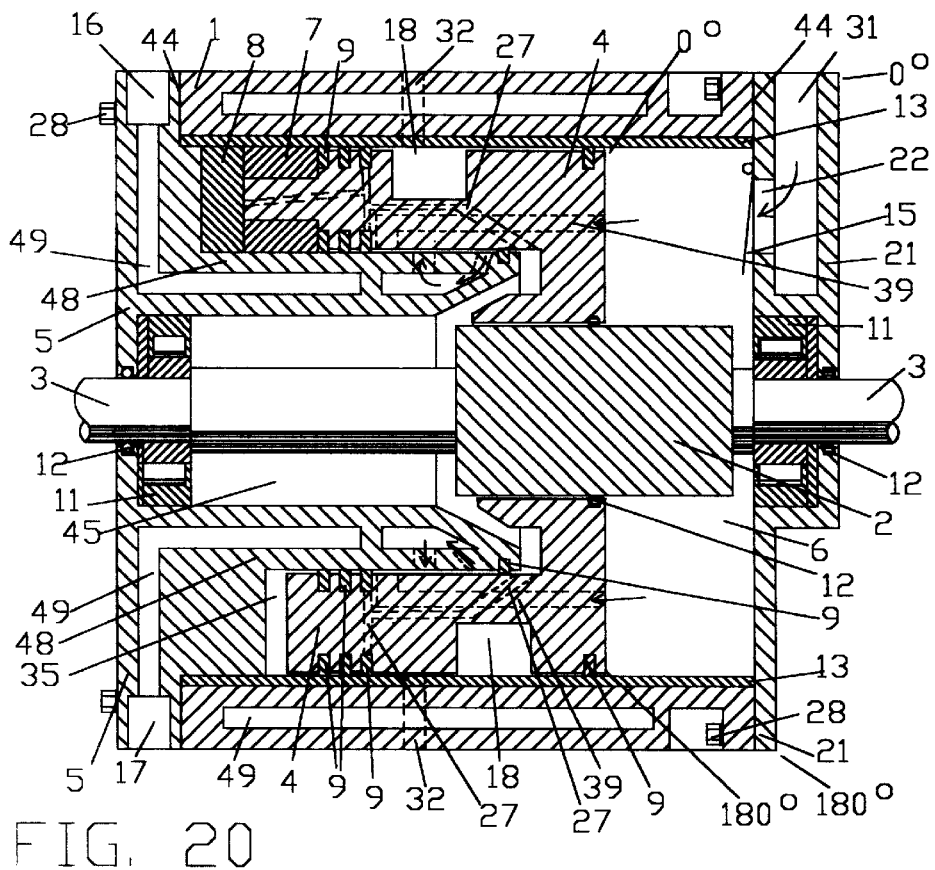

FIG. 20 is a cross sectional view of a 2 cycle, 3 cylinder chambers, rotary-reciprocal engine taken along lines 20—20 of FIG. 12.

Figure 9:
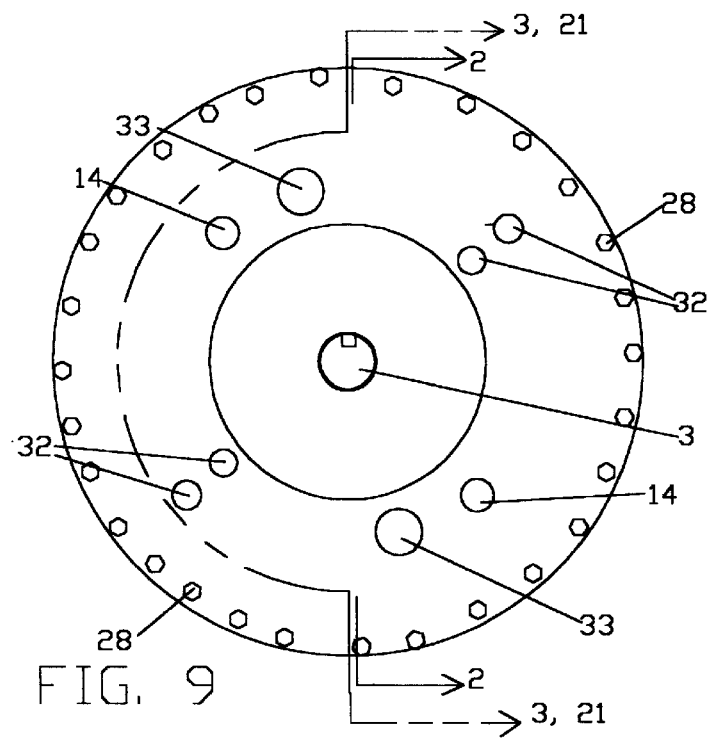
FIG. 9 is a front view of a 4 cycle, 4 cylinder chambers, rotary-reciprocal engine with fuel injection or a double 4 cycle, 4 cylinder chambers, rotary-reciprocal engine.
Figure 21:
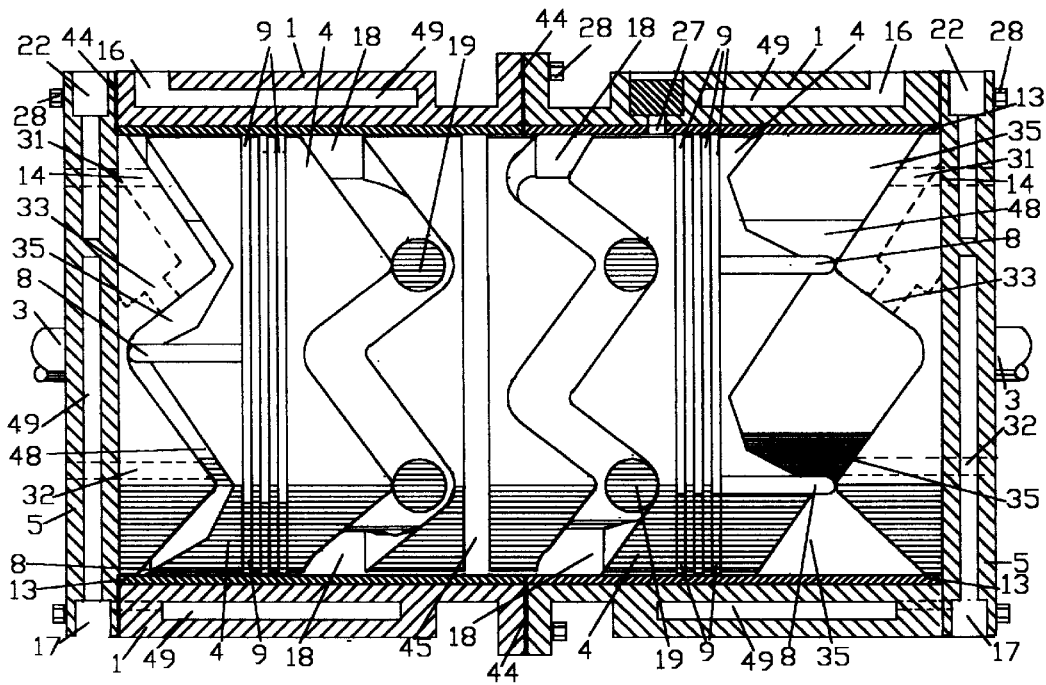

FIG. 21 is a sectional view of a 4 cycle, 4 cylinder chambers, double rotary-reciprocal engine with fuel injection, taken along lines 21—21 FIG. 9.

Figures 22, 23, 40:
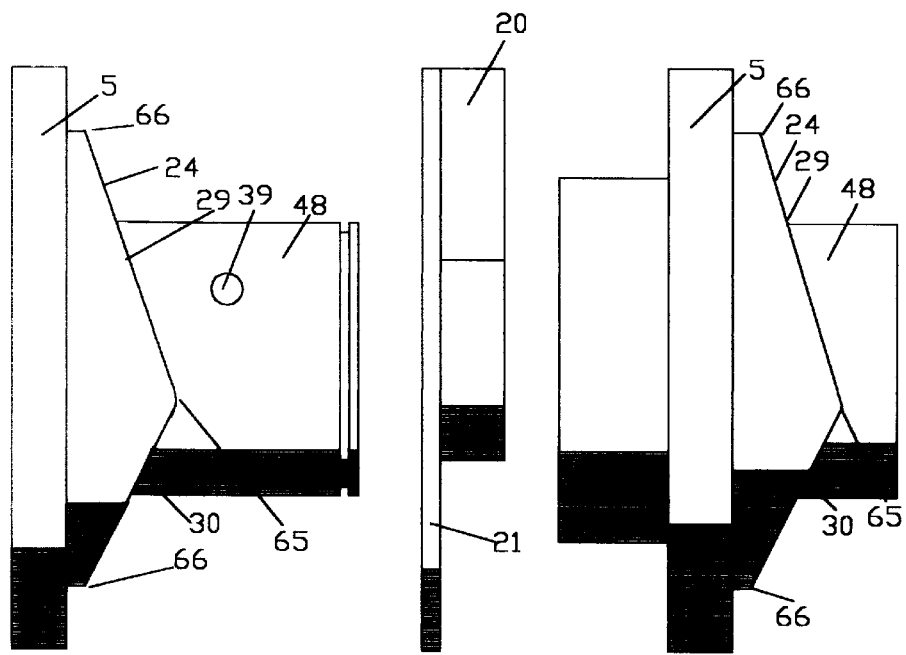

FIG. 22 is a plan view of the head of a 2 cycle, 2 cylinder chambers, rotary-reciprocal engine.

FIG. 23 is a plan view of the back end of the rotary-reciprocal engines.

Figure 24:
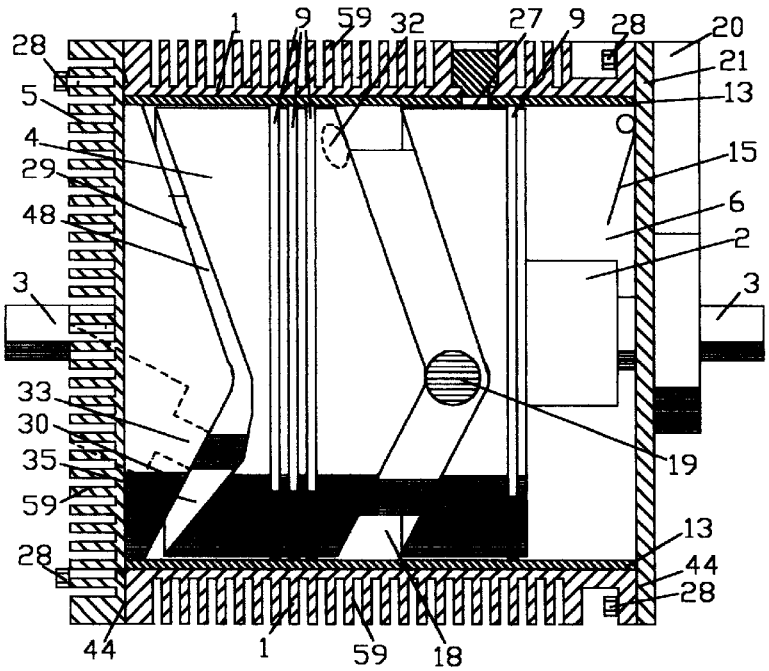

FIG. 24 is a sectional view of a 2 cycle, 2 cylinder chambers, rotary-reciprocal engine with cooling fins taken along lines 24—24 of FIG. 7.

Figure 25:
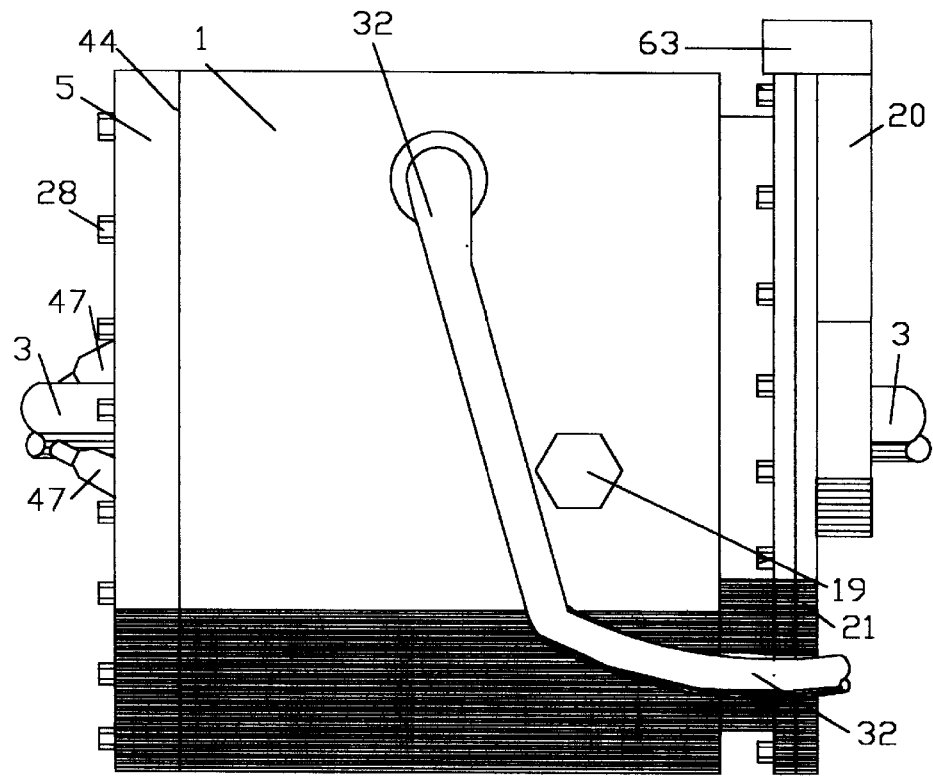

FIG. 25 is a plan view of the housing of a 2 cycle, 2 cylinder chambers, rotary-reciprocal engine.

Figure 26:
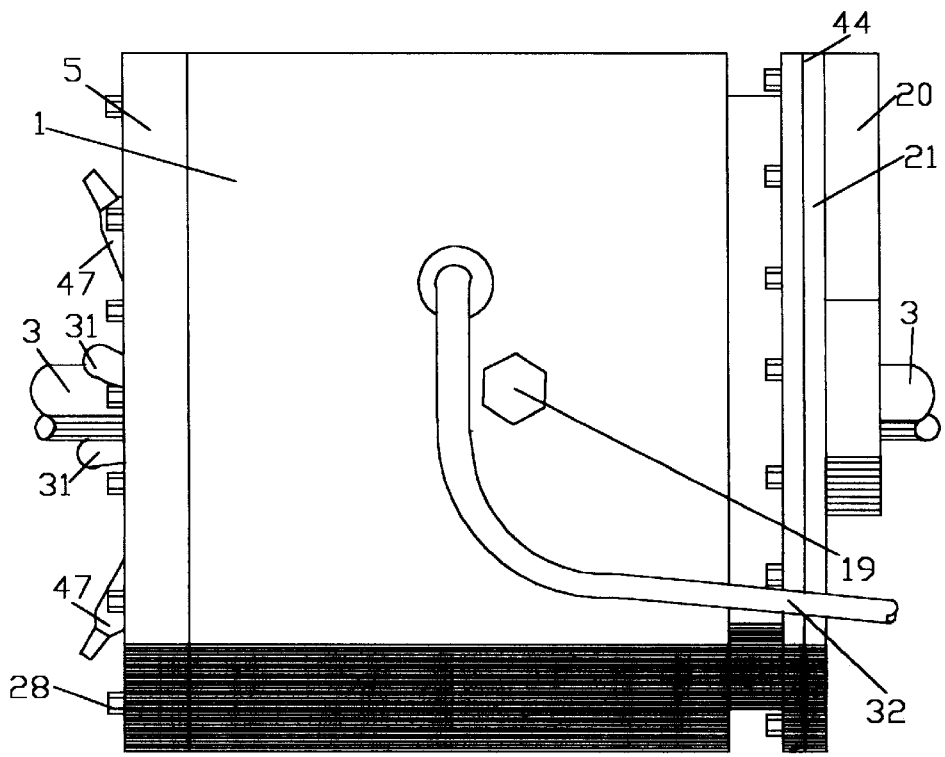

FIG. 26 is a plan view of the housing of a 2 cycle, 2 cylinder chambers, rotary-reciprocal engine.

Figure 27:
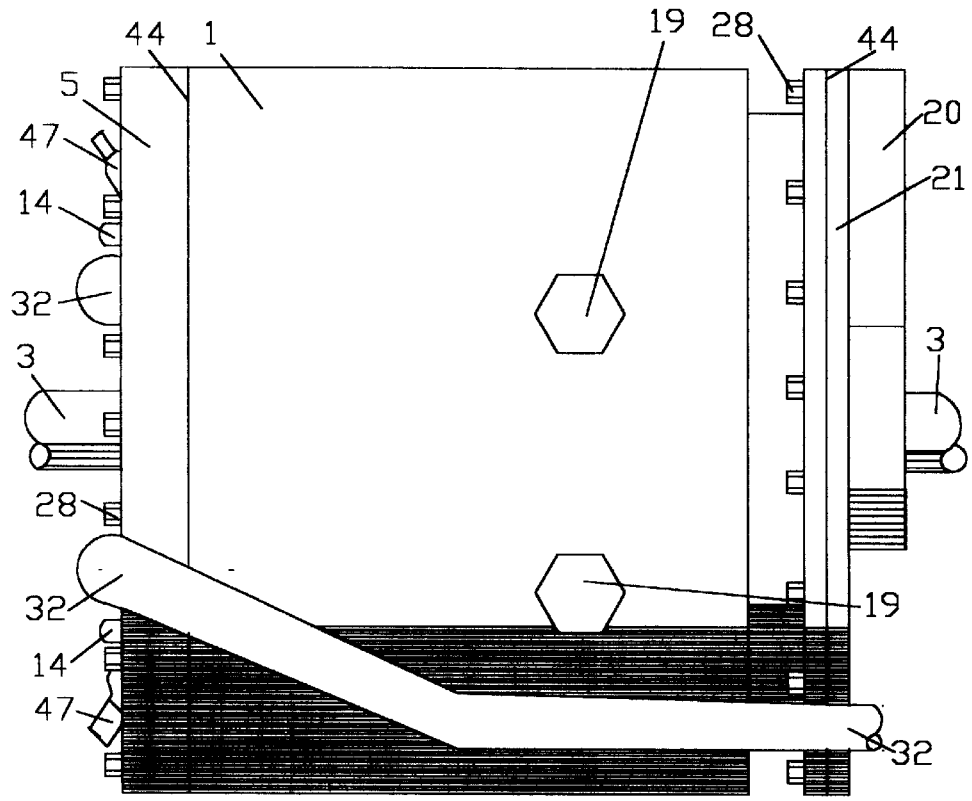

FIG. 27 is a plan view of the housing of a 4 cycle, 4 cylinder chambers, rotary-reciprocal engine with fuel injection.

Figure 28:
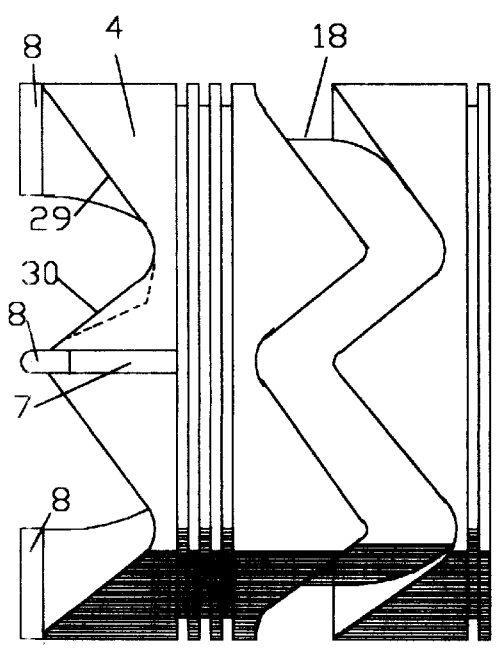

FIG. 28 is a plan view of a piston of a 4 cycle, 4 cylinder chambers, engine or a 2 cycle, 4 chambers, rotary-reciprocal engine.

Figure 29:
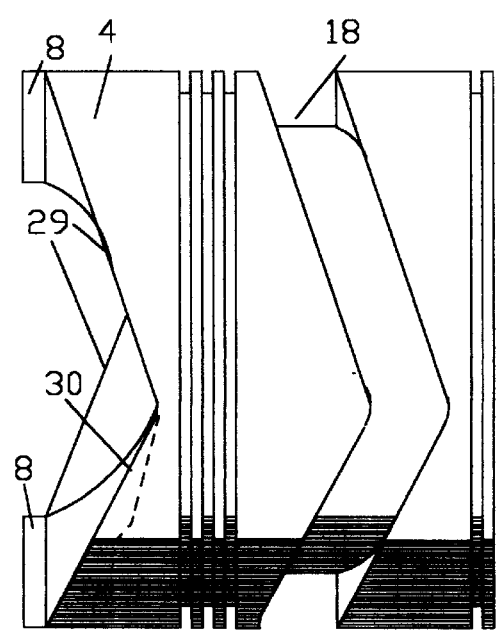

FIG. 29 is a plan view of a piston of a 2 cycle, 2 cylinder chambers, engine or a 4 cycle, 2 cylinder chambers, rotary-reciprocal engine.

Figure 30:
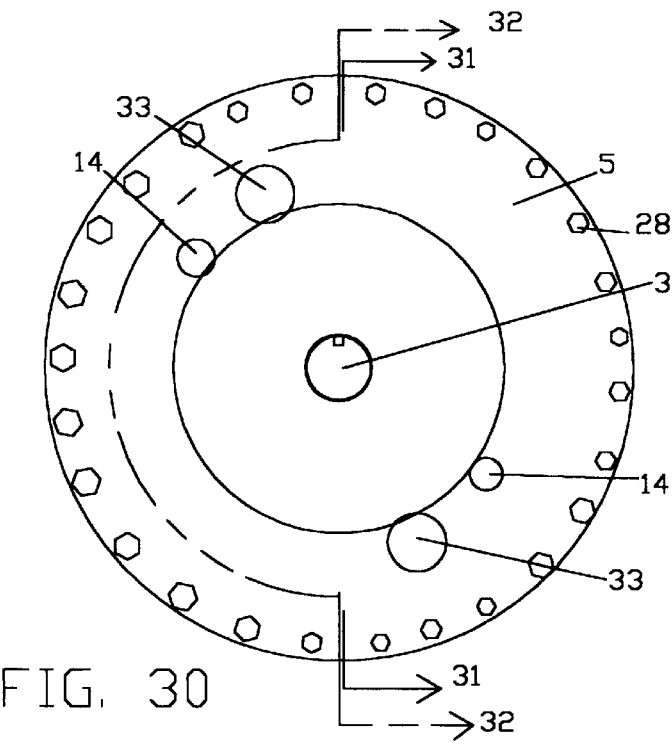

FIG. 30 is a front view of a 2 cycle, 2 cylinder chambers, rotary-reciprocal engine with fuel injection .

Figure 31:
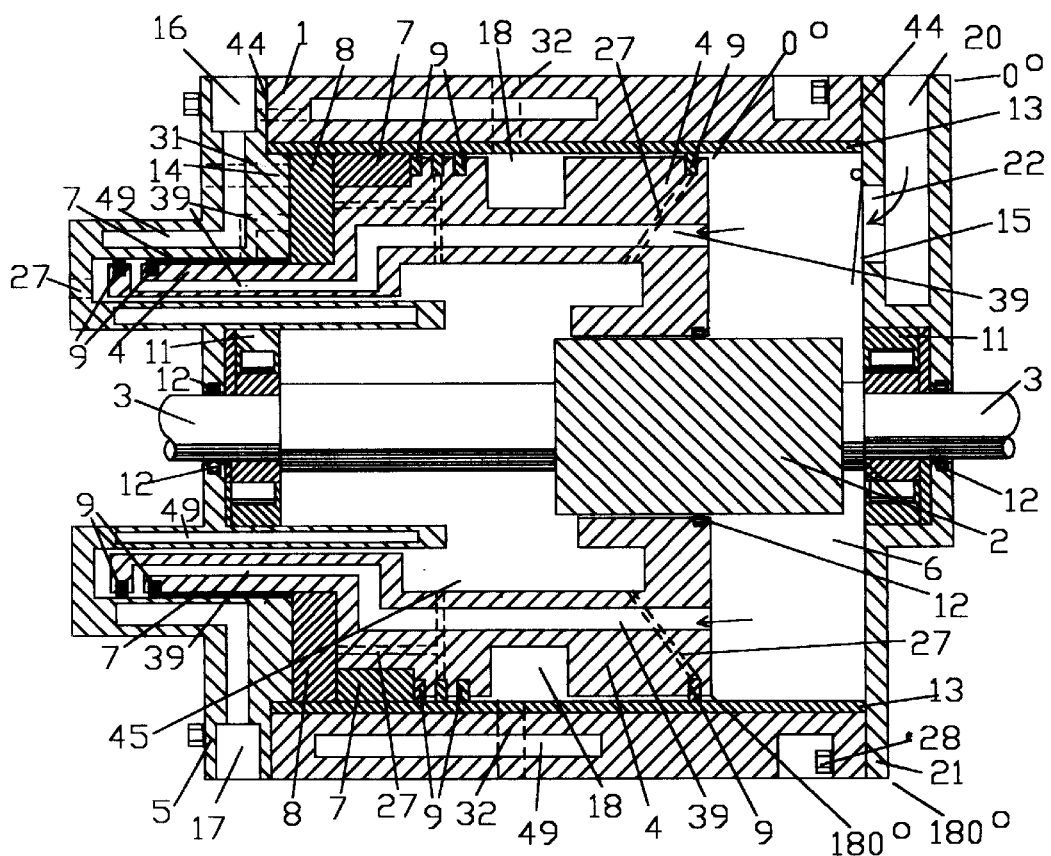

FIG. 31 is a cross sectional view of a 2 cycle, 2 cylinder chambers, rotary-reciprocal engine with fuel injection and with inner circular wall protruding out front on a 2 cycle, 4, 6 or 8 cylinder chambers, rotary-reciprocal engine.

Figure 32:
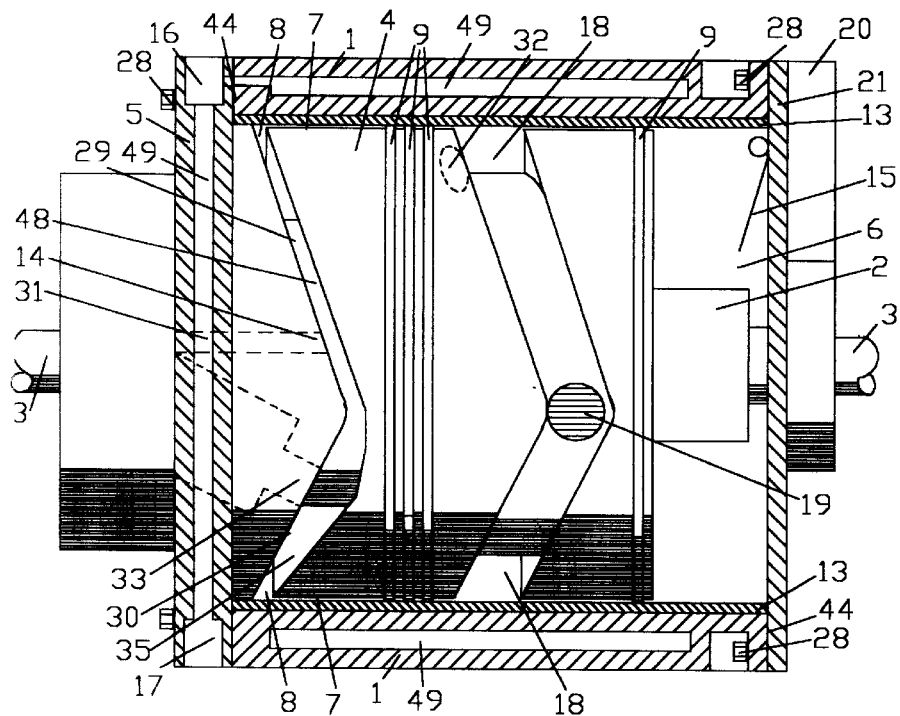

FIG. 32 is a sectional view of a 2 cycle, 2 cylinder chambers, engine with fuel injection and the inner circular wall protrudes out front.

Figures 33, 34:
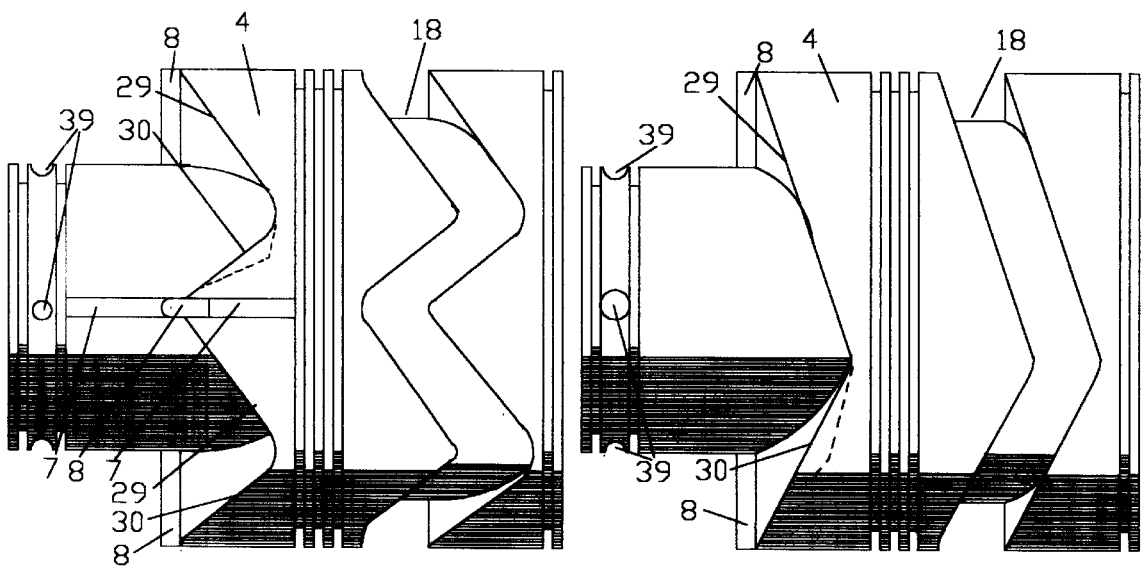

FIG. 33 is a plan view of a 4 cycle or a 2 cycle, 4 cylinder chambers, piston with the inner circular wall protruding out front.

FIG. 34 is a plan view of a 2 cycle or 4 cycle, 2 cylinder chambers, piston with the inner circular wall protruding out front.

Figures 35, 36:
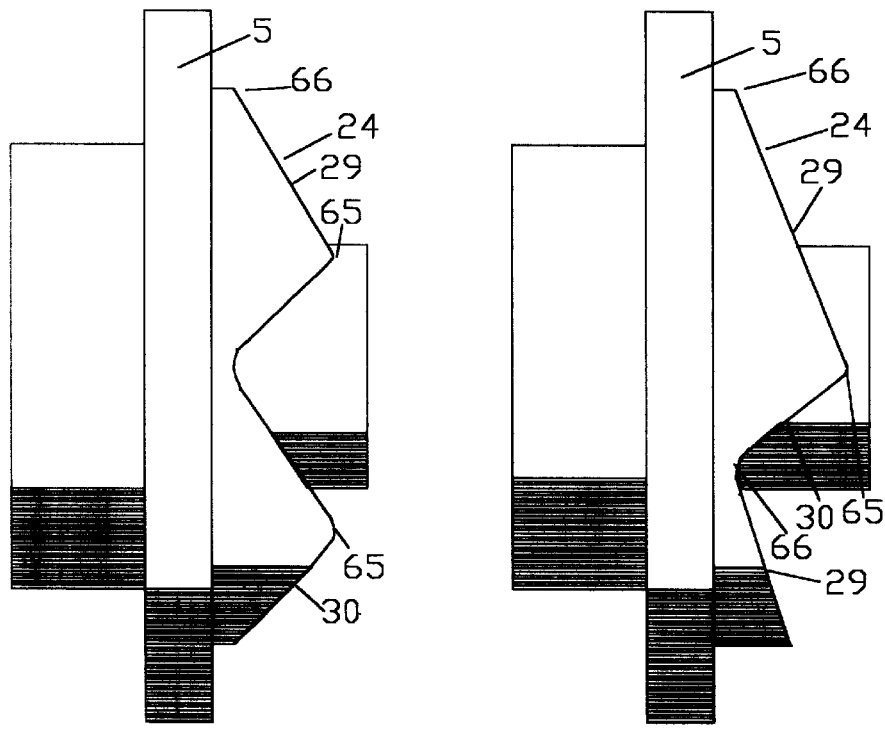

FIG. 35 is a plan view of a 2 cycle or 4 cycle, 4 cylinder chambers, head with the inner circular wall protruding out front.

FIG. 36 is a plan view of a 2 cycle or 4 cycle. 2 cylinder chambers, head with the inner circular wall protruding out front.

Figure 37:
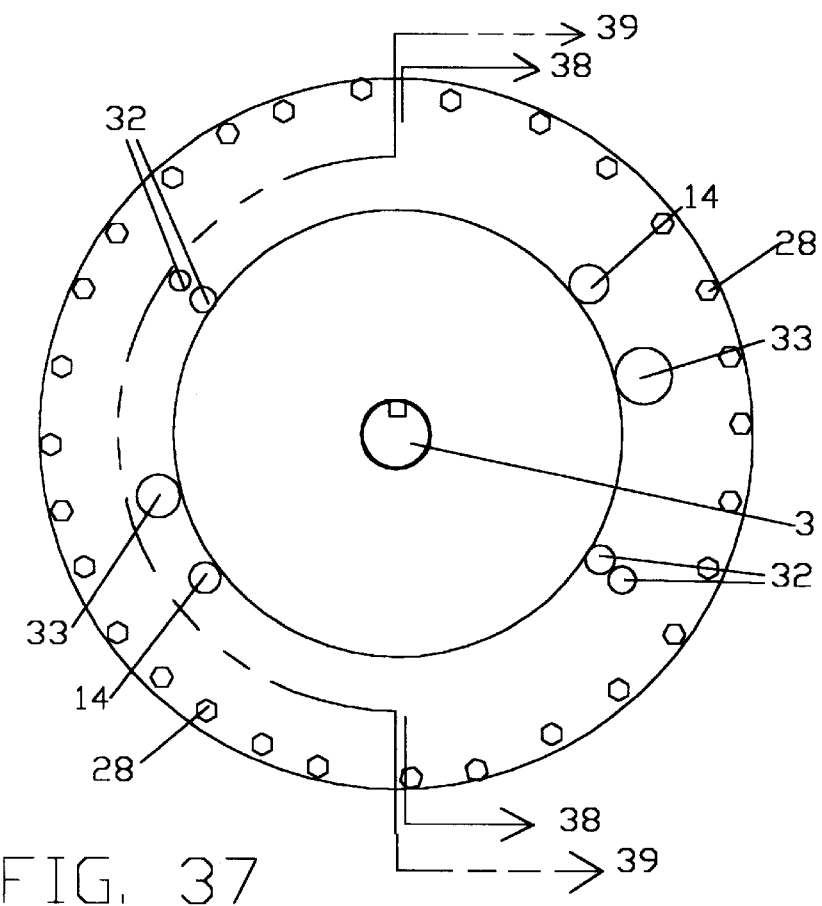

FIG. 37 is a front view of a 4 cycle, 4 cylinder chambers, rotary reciprocal engine with fuel injection and the inner circular wall protruding out front.

Figure 38:
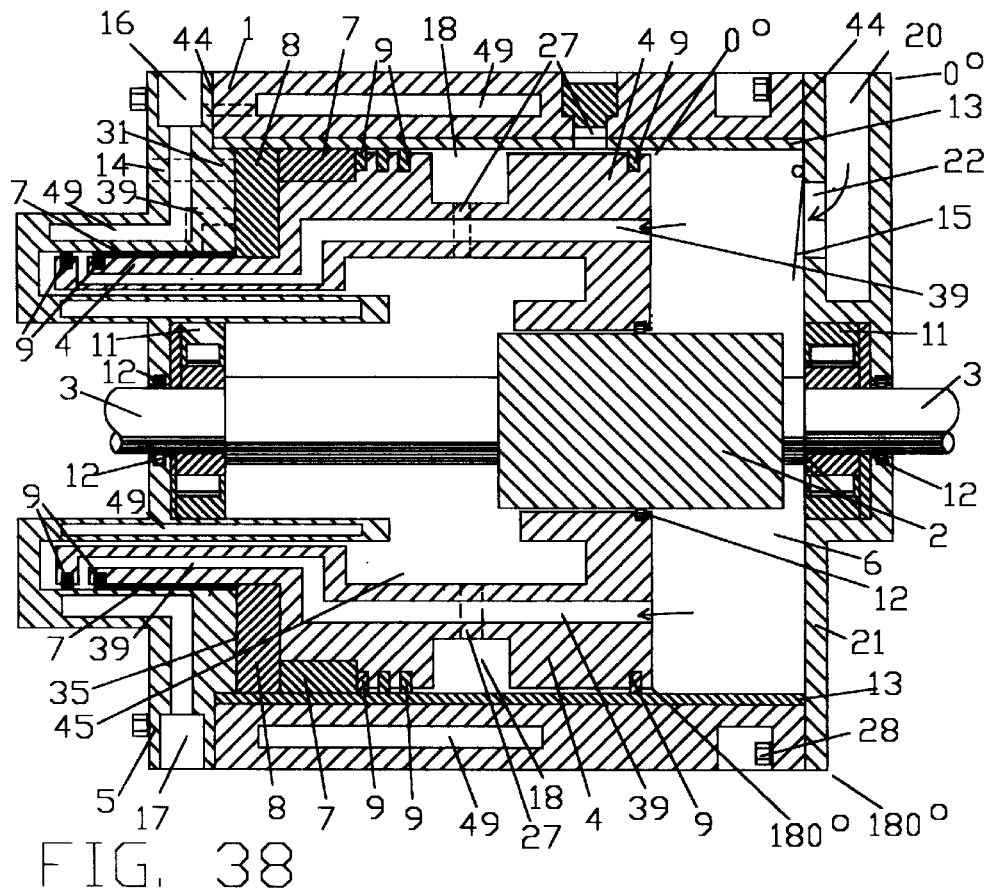

FIG. 38 is a cross sectional view of a 4 cycle, 4 cylinder chambers, engine with fuel injection taken along the lines 38—38 of FIG. 37 or a 4 cycle, 2, 6, or 8 cylinder chambers, rotary-reciprocal engine.

Figure 39:
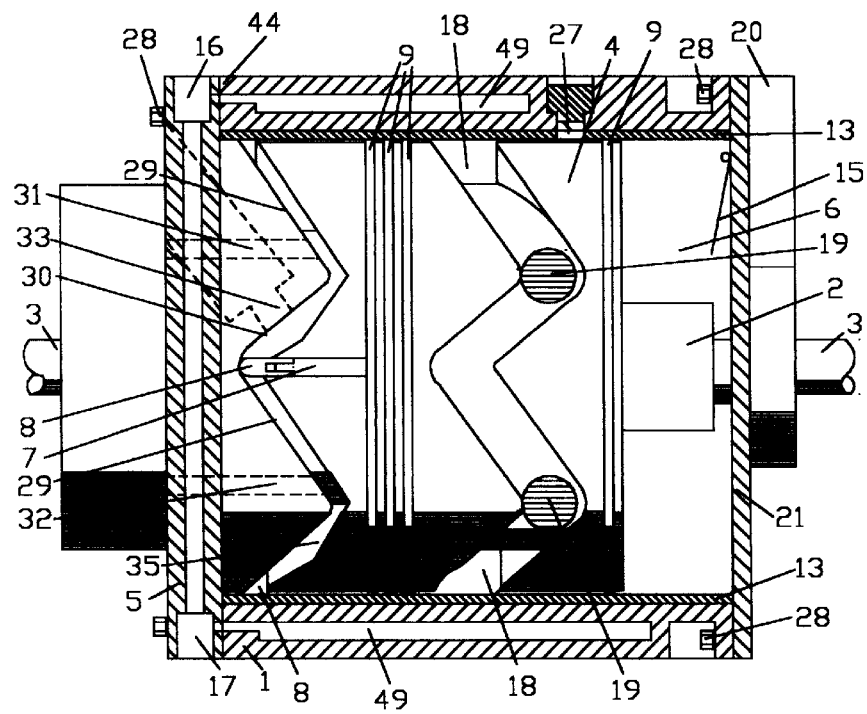

FIG. 39 is a sectional view of a 4 cycle, 4 cylinder chambers, rotary-reciprocal engine with fuel injection taken along the lines of 39—39 of FIG. 37

FIG. 40 is a plan view of a 2 cycle or 4 cycle, 2 cylinder chambers, head with the inner circular wall protruding out front.

Figure 41:
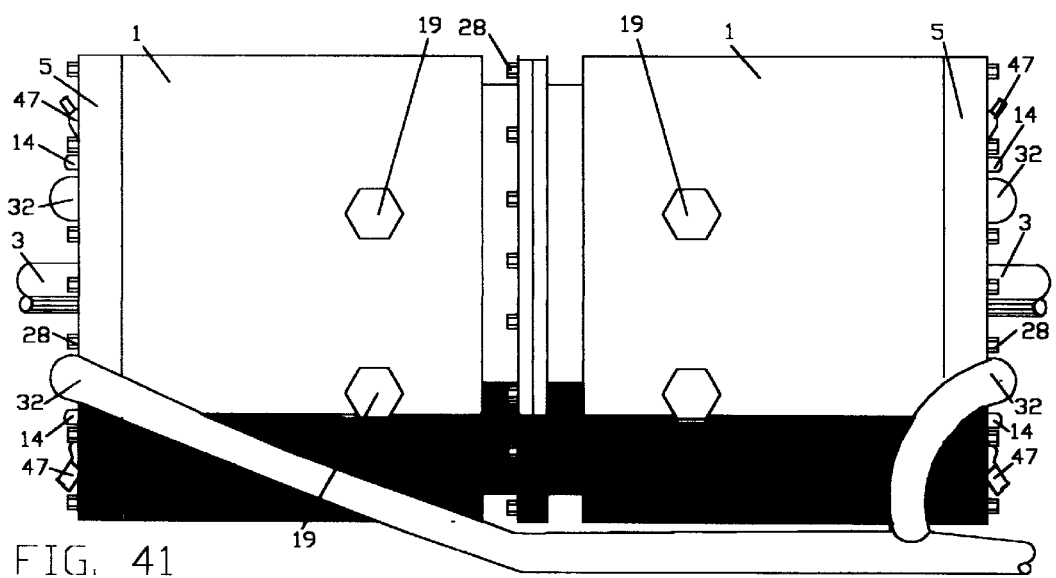

FIG. 41 is a plan view of a 4 cycle, 4 cylinder chambers, double rotary-reciprocal engine with fuel injection.

Figure 42:
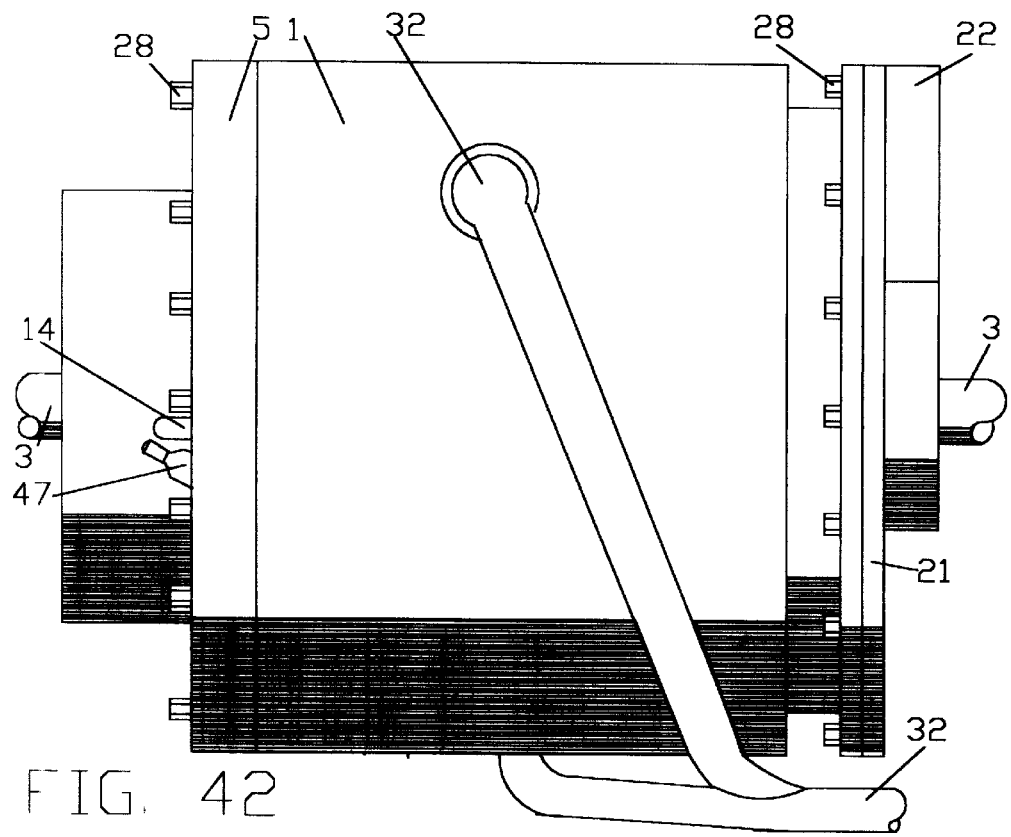

FIG. 42 is a plan view of a 2 cycle, 2 cylinder chambers, engine with fuel injection and the inner circular wall protruding out front.

DESCRIPTION OF PREFERRED EMBODIMENT

Figure 2:
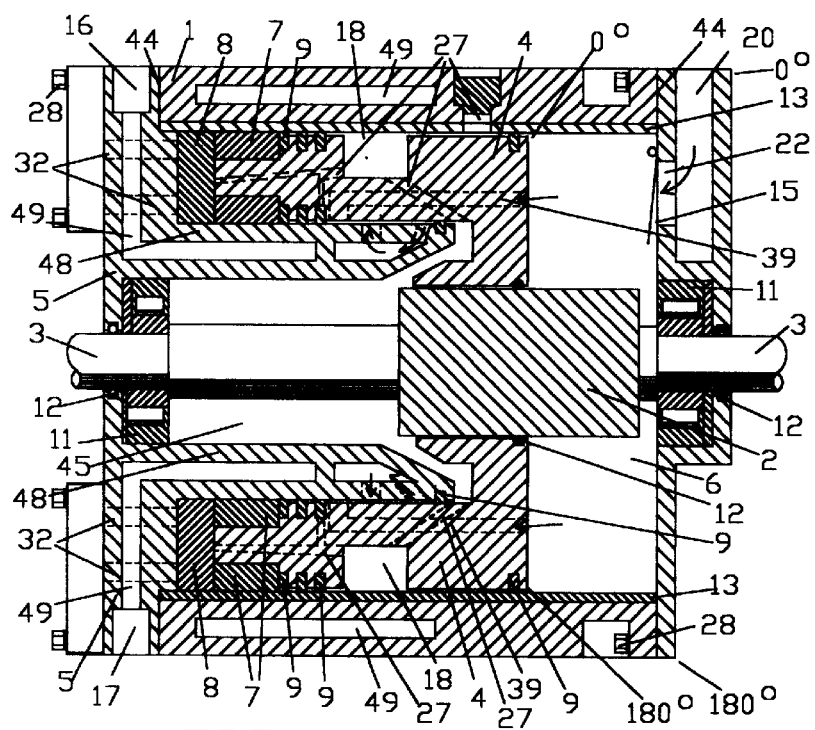
FIG. 2 is a cross sectional view of FIG. 1 taken along the lines of 2—2 of FIG. 1.
Figure 4:
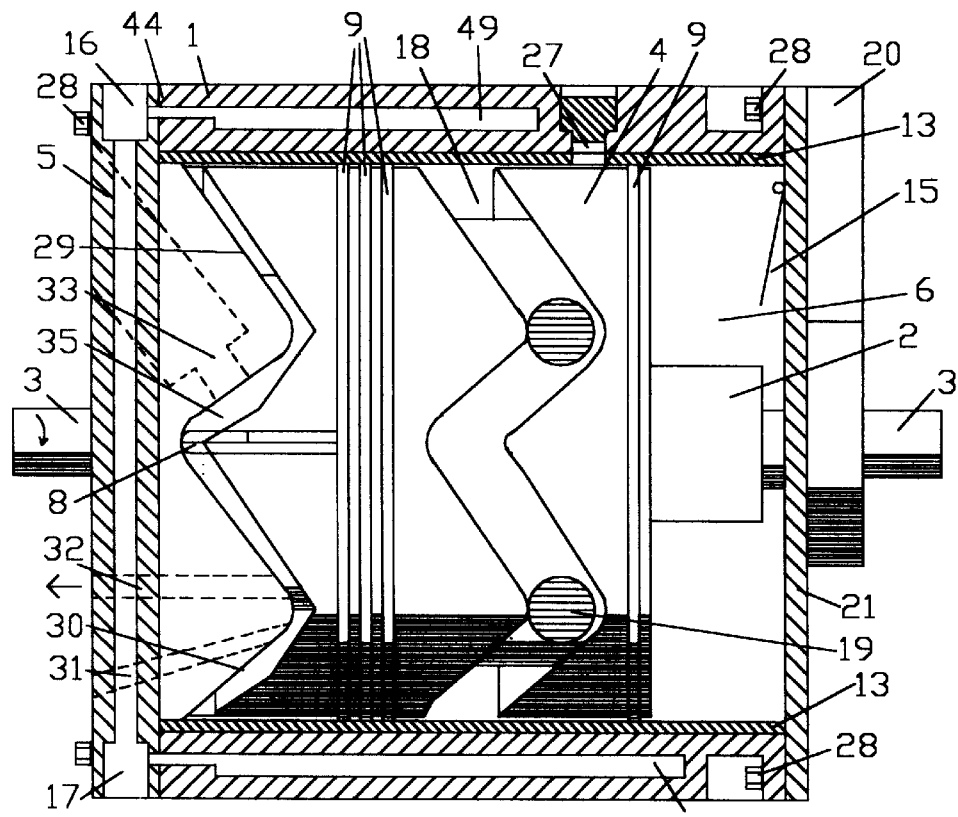
FIG. 4 is a sectional view of a 4 cycle, 4 cylinder chambers, rotary-reciprocal engine, taken along the lines 4—4 of FIG. 1.
Figure 3:
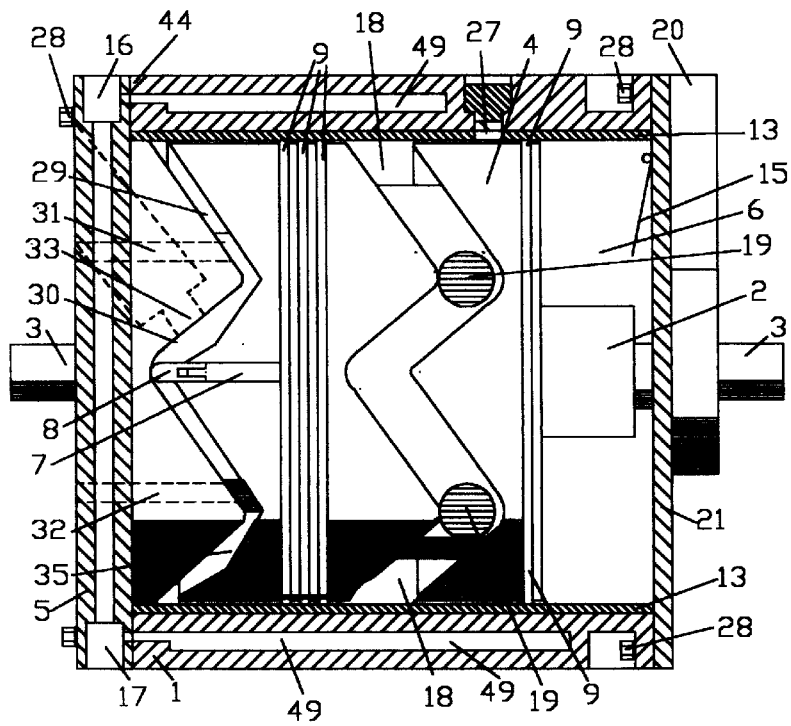
FIG. 3 is a sectional view of a 4 cycle, 4 cylinder chambers, rotary-reciprocal engine, taken along the lines 3—3 of FIG. 1.

Referring to the drawings and in particular to FIG. 1, FIG. 2, FIG. 3, FIG. 4 and FIG. 5 the 4 cycle, 4 cylinder rotary-reciprocal engine of the present invention includes an engine housing 1 which has a water Jacket in the front wall 5 of the engine housing attached by bolt 28, a posterior wall 21 for posterior compression chamber 6 is attached to the posterior of the engine housing by bolts 28. An attachment (guide bolt) 19 goes thru the housing and holds the rotary-reciprocal guide groove 13 in place. The round portion of the engine shaft 3 extends out through the center of the housing's walls. The rotor 2 is attached to the shaft 3 and the piston 4 reciprocates across the rotor 2 and rotates with it. FIG. 1 illustrate the location of the fuel intake 31, the exhaust ports 32, the spark plug ports 33 and the shaft 3. In FIG. 2 the housing 1 contains a contains a passage 49 for a coolant, an oil passage way 27 and the inner wall of the housing is lined with a cylinder sleeve 13. The engine head 5 contains a passage way 49 for coolant which has an intake 16 and a exit 17, an opening for the shaft and a depression for the bearings 11 and seal 12. The circular wall 48 of the head forms the inner wall of the cylinder chamber 35, contains a passage 49 for coolant, a passage for compressed air 39, a ring to seal the cylinder chamber and in the center of the inner circular wall 48 form an anterior chamber for an oil reservoir 45 and/or an anterior compression chamber. The inner, peripheral surface of the head contains wavy surfaces with the long surface of the combustion rotary stroke 29 and the short compression stroke surface 30. The piston 4 is rotary and reciprocally mounted in the housing cavity, and on a centrally located stationary engine rotor 2 on which it reciprocates and rotates with the rotor 2. The piston 4 has a wavy front peripheral surface with a long expansion surface 29 and a short compression surface 30, on each crest of the waves there are seals 7, 8, which seal the combustion chamber 35 along with the rings 9. The piston has a wavy guide groove 18 on the posterior it's peripheral surface which matches the waves on the front of the piston. The piston has an air passage 39, an oil passage 27 and a ring 9 and seal 12 to seal off the compression chamber 6 from the combustion chamber 35. The posterior wall 21 has a passage 20 for air or air and gaseous mixture to be vacuumed through passage way 22, which has a one way valve 15, into the posterior chamber 6. The center of the posterior wall on the inner surface has a pocket for a bearing 11, a seal 12 and an opening for the shaft 3. FIG. 3 illustrates the guide groove 18 with the guide projection 19 in place, the combustion chamber 35, the long combustion stroke surface 29, the short compression stroke surface 30 and the seals 7 and 8 in place. The location of the fuel intake port 31 for a carburetor 63, the exhaust port 32 and the spark plug port 33 are shown. FIG. 4 illustrates the location of the fuel intake port 31 for the fuel injection system 14. FIG. 5 illustrates the wavy interior peripheral surface 24 of the head with the long combustion stroke surface 29 and the short compression or exhaust stroke surface 30, the crest of the wave 65 and the trough of the wave 66, the inner circular wall 48 with the air passage 39 and the ring 9 groove. FIG. 9 illustrates the location of the fuel injection system 14, the spark plug ports 33 and the exhaust ports of a 4 cycle, 4 cylinder chambers engine with fuel injection or a 2 cycle, 2 cylinder chambers, engine with fuel injection.

Figure 8:
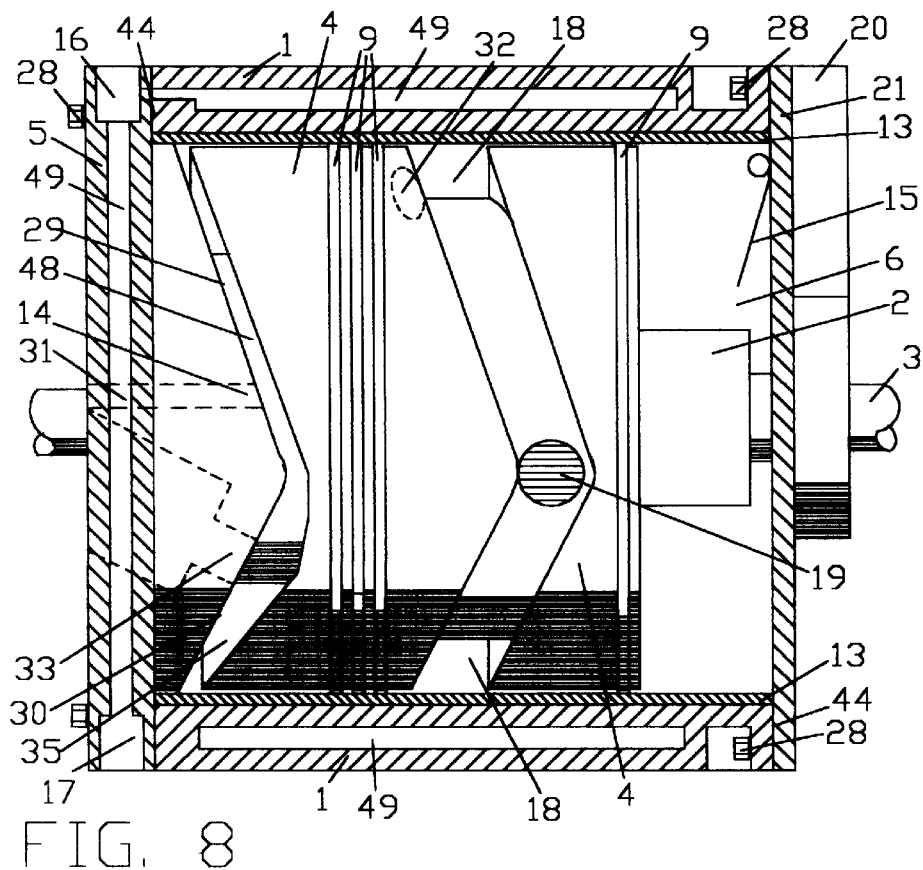
FIG. 8 is a sectional view of a 2 cycle, 2 cylinder chambers, rotary-reciprocal engine, taken along the lines of 8—8 of FIG. 7.

Referring to FIG. 6, FIG. 7, FIG. 8 and FIG. 9 are views of a 2 cycle engine. FIG. 6 is a plan view of a head 5 of a 2 cycle, 2 cylinder chambers, engine showing the wavy peripheral surface 24 of the head containing long waves 29 of the combustion stroke and the short waves of the compression stroke 30, the crest of the wave 65 and the trough of the wave 66 and posterior to the wavy surface is the inner circular wall 48, which has an air passage 39 and a ring 9 groove. FIG. 7 is a front view of a 2 cycle, 2 cylinder chambers, engine illustrating the location of the spark plug ports 33, fuel injector 14 and the shaft 3 opening. Referring to FIG. 8 a sectional view of a 2 cycle, 2 cylinder chambers, engine consist of a fixed engine housing 1 having a cylindrical cavity which is divided into lateral and peripheral located cylinder chambers 35, an anterior chamber 45 for oil, which is located in front of a posterior compression chamber 6. The cylinder chambers are formed by the frontal lateral peripheral wall, the arcuate recessed front side wall 24 and the partial circular Inner wall 48. The housing 1 and head 5 contains coolant passages 49. The head contains a spark plug port 33, an air-fuel intake port 31 and a fuel injection system 14. There is a rotor 2 attached to the shaft 3 and the piston 4 reciprocates on the rotor 2 and rotates with the shaft 3. The reciprocal motion and rotary motion is guided by a guide bolt 19 which fits in the guide groove 18. The chamber are sealed by means of rings 9 and seals 7 and 8. There is an exhaust port 32 in the housing 1.

The piston 4 is rotary and reciprocally mounted in the housing cavity on a centrally located engine rotor 2. The piston is cylindrical shaped with a thick anterior peripheral area which has waved surface on the front peripheral side wall which are at 90 degrees to the peripheral wall of the piston 4, with the combustion stroke 29 of the wave being longer the compression stroke 30 of the wave, with the central area being open in front The posterior piston wall is at 90 degrees to the peripheral wall of the piston and is closed and has a hub in the central area which protrudes at 90 degrees. There is an non-round (square) opening in the center of the posterior wall which fits oven the peripheral area of the rotor 2. The piston 4 reciprocates on the engine rotor 2 by means of a bearing or a metal oil bearing. The engine rotor is attached to the shaft 3 which is mounted on bearings 11 on the side walls, front 5 and posterior 21, and rotates with the rotor and piston. The piston 4 has rings 9 which close off the cylinder chamber 35 from the anterior chamber 45 and posterior compression chamber 6, and the piston 4 fits into the housing cylindrical chamber. The piston 4 has a rotary and reciprocal guide 18 on the peripheral surface of the piston 4 and its anterior wall has equally spaced waves with longer combustion portion 39 of the wave and a shorter compression portion of the wave 30 which are the same shape and number as the waved shape piston surface 25 and the arcuate recesses 24 in the engine housing's front peripheral wall. The center of the piston 4 has a passage way 39 that communicates which the posterior compression chamber 6 thru the inner piston wall and communicate with the cylinder chamber 35 when piston 4 reciprocates posteriorly and the cylinder chamber 35 is expanded to its maximum, and the fuel-gaseous mixture passes into the cylinder chamber 35 while the exhaust gases pass out the exhaust port 32 on the peripheral wall of the engine housing 1. The posterior wall 21 has an inlet 22 for air, fluid or fuel-air mixture and has a one way valve 15 such as a Reed valve going into the posterior compression chamber 6.

Figure 10:
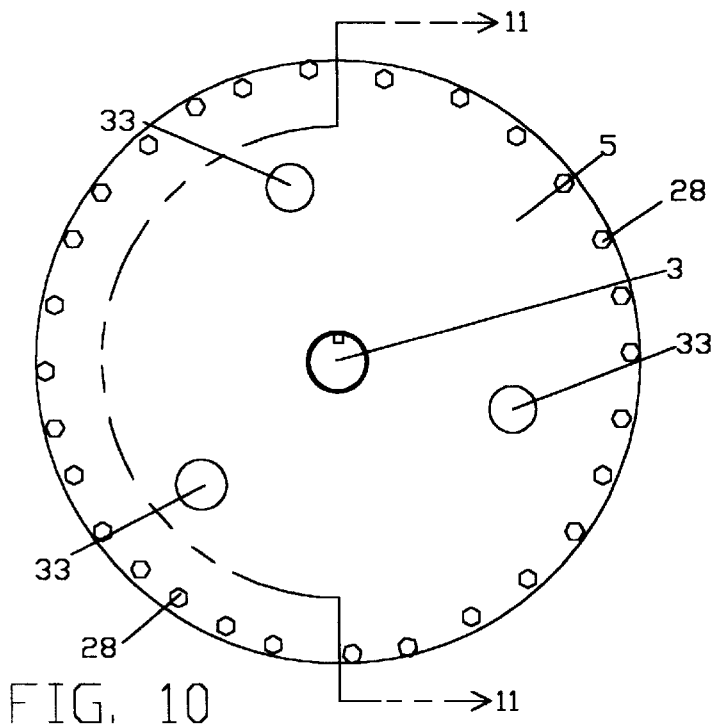
FIG. 10 is a front view of a 2 cycle, 3 cylinder chambers, rotary-reciprocal engine or a double 2 cycle, 3 cylinder chambers, rotary-reciprocal engine.
Figure 11:
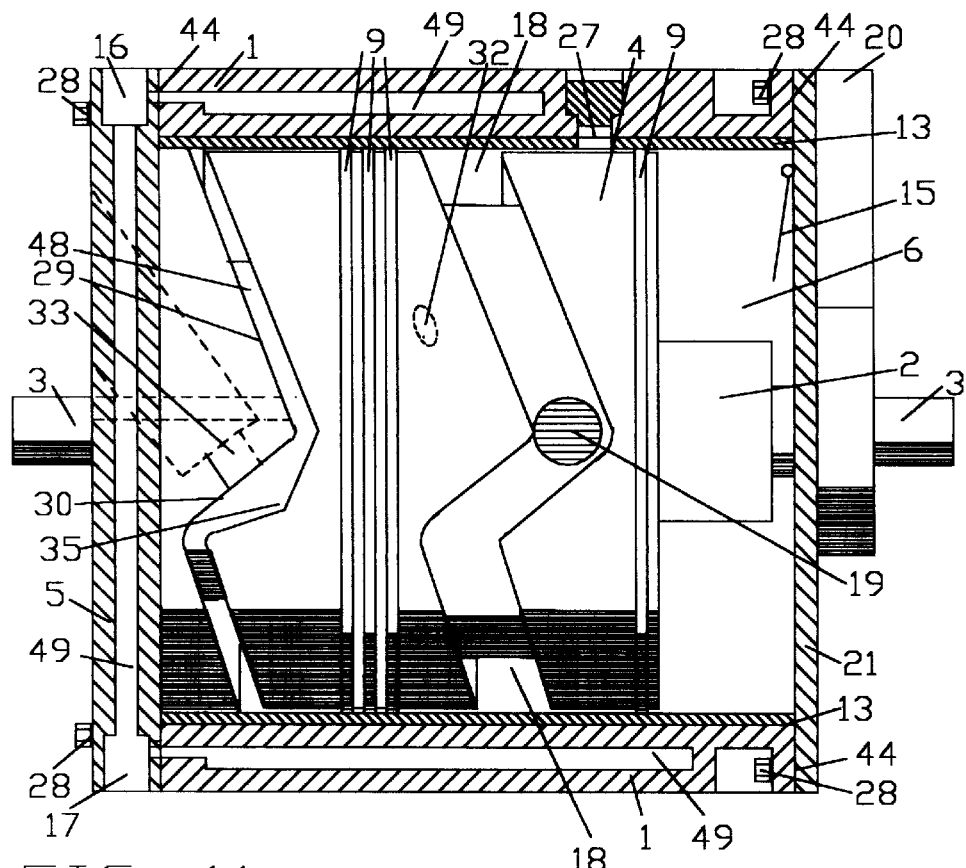
FIG. 11 is a sectional view of a 2 cycle, 3 cylinder chambers, rotary-reciprocal engine, taken along lines 11—11 of FIG. 10.
Figure 13:
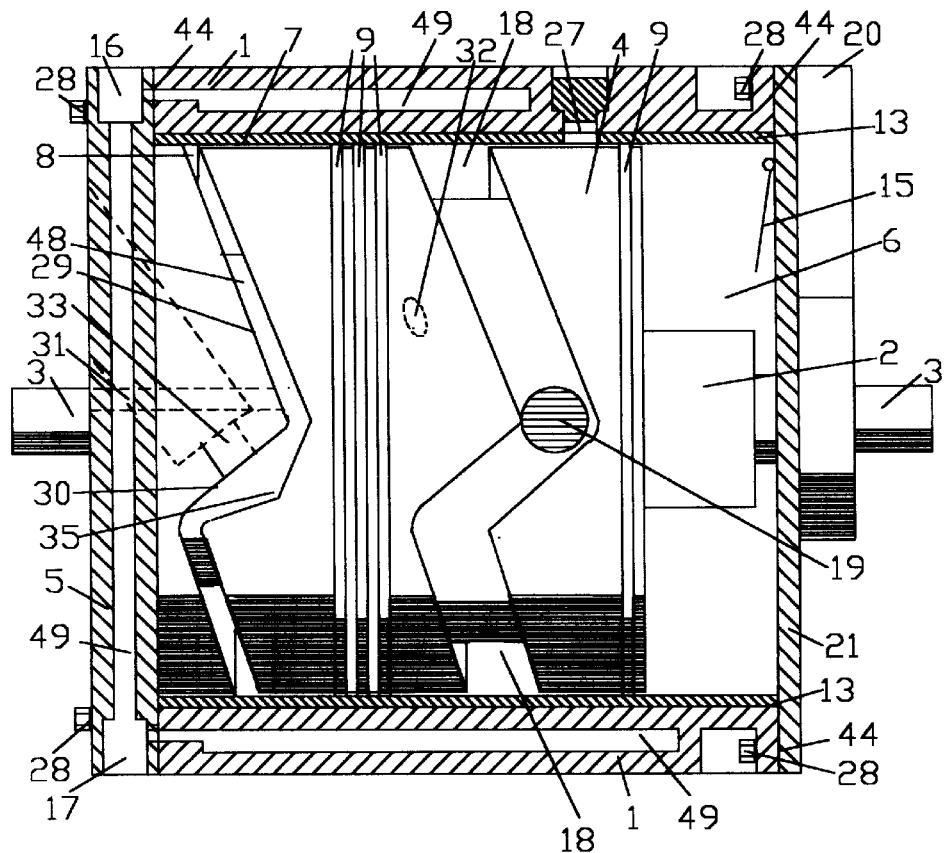

Referring to FIG. 10, FIG. 11, FIG. 12 and FIG. 13 are views of a 2 cycle, 3 cylinder chambers, engine. FIG. 10 is a frontal view of a 2 cycle, 3 chambers, engine with the gaseous fuel mixture going into the posterior compression chamber and also illustrating the location of the spark plug ports 33 and the shaft 3. FIG. 11 is a sectional view of the 2 cycle, 3 cylinder chambers, engine, showing the piston 4. The engine has a cylindrical housing 1 containing cooling passages 49, oil passage 27 and the inner wall is lined with a cylinder liner 13. The head 5 and posterior wall 21 are bolted to the housing 1 by means of bolts 28 and has a gasket 44 between them. The coolant passages are connected to an inlet 16 and outlet 17. The position of the spark plug port 33, exhaust port 32 and the guide bolt 19 is illustrated on this view. The piston 4 has rings 9 and seals 7, 8 that seals the combustion chambers and has a ring 9 and a seal 12 along with the one way valve 15 that seals off the posterior compression chamber. The piston 4 has a rotary-reciprocal guide groove 18 and along with the stationary guide bolt 19 the rotary and reciprocal motions are guided while the piston 4 rotates in the housing 1. FIG. 12 is a frontal view of a 2 cycle, 3 cylinder chambers, engine with fuel injection, and it illustrates the location of the injection ports 14, the exhaust ports 33 and the shaft 3. FIG. 13 is a sectional view of a 2 cycle, 3 cylinder chambers 35, engine with fuel injection 14 showing the piston 4. It illustrates the location of the spark plug port 33, the intake port 31 and exhaust port 32. It illustrates the head 5 with the long wavy expansion surface 29 and the short wavy compression surface 30 of the head 5. The guide bolt 19 fits into the guide groove 18 to guide the reciprocal and rotary motions of the piston 4. The shaft 3 protrudes out the front 5 and back walls 21 and has an attached rotor 2. The piston 4 reciprocates on the rotor and rotates with it. The housing 1 has an oil passage 27 to oil the engine parts. Attached to the posterior wall 21 is an air-fuel intake 20 port. A one way valve 15 allows the fuel-air to flow into the posterior chamber 6 but prevents it from flowing out.

Referring to FIG. 14 which is a cross sectional view of a 4 cycle, 4 chambers, engine with the piston 4 in full expansion stroke, with the compressed air from the posterior compression chamber 6 flowing through passage 39 into the cylinder chamber 35 while pushing out the exhaust gases through the exhaust ports 32. The piston 4 has reciprocated to the posterior peripheral aspect of the rotor 2. The combustion chambers 35 are sealed from the posterior compression chamber 6 by the rings 9 pressing against the inner wall of the cylinder liner 13 and the inner circular wall 48 except for the air passage way 39 in the piston 4. The square rotor 2 is attached to the shaft 3 which is held in place in the center of the engine by means of the bearings 11 in the head 5 and posterior wall 21, the shaft 3 extends through the head and posterior wall. The piston 4 is rotary and reciprocally mounted in the housing 1, and its rotary and reciprocal motions are guided by the piston's guide groove 18. The engine is lubricated by oil from the central anterior chamber 45 by way of oil passage ways 27. The housing 1 and head 5 contains coolant passages 49 which has an inlet 16 and an outlet 17. The posterior wall 21 has an air passage way 20, to the posterior compression through the opening 22 and pass through a one way valve 15.

Referring to FIG. 15, FIG. 16, FIG. 18 and FIG. 19 which are views of a 2 cycle, 2 cylinder chambers, engine with fuel injection. FIG. 15 is a frontal view of a 2 cycle, 2 cylinder chambers, engine with fuel injection which illustrates the location of the injection port 14 and the spark plug port 33. FIG. 16 is a cross sectional view of a 2 cycle, 2 cylinder chambers, engine with the piston at the end of combustion stroke. The housing 1 is designed so that the back wall 21 can be removed and the engine connected with another engine to form a double engine. The cylindrical housing 1 has exhaust ports 32 which are opened at the end of the combustion stroke, it contains coolant passages 49, an oil passage 27, and the inner wall is lined with a cylinder liner 13. The head 5 and posterior wall 21 are bolted to the housing 1 by bolts 28 and a gasket 44. The head has coolant passages 49 with an inlet 16 and an outlet 17, an inner circular wall 48 with coolant 49 and air passages 39; The inner chamber of the head contains the shaft 3 bearings 11 and an oil chamber 45 with passages 27 to the piston 4. The piston 4 is reciprocally and rotary mounted in the housing 1 and reciprocally mounted on the rotor 2. The piston has rings 9 and seals 12, 7, 8, which seals the cylinder chambers and posterior compression chamber 6. There is a wavy guide groove 18 on the peripheral area of the piston 4 to guide the rotary and reciprocal motions of the piston 4. The posterior wall 21 has a passage way 20 which is the intake 31 for the air-gaseous mixture which passes through the opening 22, through a one way valve 15, then into the posterior chamber where it is compressed, then passed through the passage 39 in the piston 4 to the cylinder chambers 35. The piston 4 contains oil passages 27 for lubrication. FIG. 18, FIG. 19 and FIG. 20, is a 2 cycle, 2, 4, 6 or 8 cylinder chambers, engine with the cylinder chamber compressed and the parts are similar to those of FIG. 16. FIG. 18 has the intake port 31 in the posterior wall 21. FIG. 19 has an intake port 31 by means of a fuel injection system 14 and FIG. 20 has intake port 31 in the posterior wall.

Referring to FIG. 17 which is a cross section of a 2 or 4 cycle, 2 or more cylinder chambers, double engine which can be made by boiling two of the FIG. 16 engines together without the posterior wall 21 and utilizing a double length shaft 3 with a double length rotor 2. The housing of the double engine consist of two cylindrical housing 1 which are bolted 28 together and contains passage ways 49, an oil passage way 27, an inner cylinder liner 13 and a exhaust port for 2 cycle engines. A head 5 is bolted 28 with a gasket 44 to the housing 1 and it has passages 49 for coolant, air 22 and an intake port 31. The peripheral inner area of the head 5 has maximum arcuate recessed area 64 and a minimum recessed area 65, and from the minimum recessed area to the maximum arcuate area 64 is a longer surface area 24 which produces a longer expansion stroke 29, then from the maximum arcuate 64 area to the minimum arcuate recessed area 64 is a shorten surface area 24 which produces a shorter compression stroke 30. The inner circular wall 48 forms a compression chamber 6 which vacuum in air or a air-gaseous mixture thru the intake 31 passage ways 22 and 39 or the fuel is passed thru the intake port 31 by a fuel injection system 14. It is then compressed by the piston. The shaft 3 passes through the center of the head 5 and is held in place by a bearing 11 and the opening is sealed with a seal 12. The pistons 4 are rotary and reciprocally mount in the housing 1 and reciprocates separately on the rotor 2 but rotates with the rotor. The pistons 4 have thick peripheral anterior walls with waves. The front piston 4 is mounted with the crest of the wave of the piston fitting into the minimum arcuate recessed area 65 of the head 5 and the maximum recessed area 64 of the head 5 fitting into the trough of the wave on the piston 4. The posterior piston is mounted with the crest of the wave of the piston fitting opposite the maximum arcuate recessed area 65 of the head 5. The pistons 4 have separate rotary-reciprocal guides groove 18, and the pistons 4 reciprocate separately and at different times due to the long combustion stroke 29 and short compression stroke 30. The pistons 4 has rings 9 and seals 7,8 to seal off the cylinder chambers 35 and compression chambers 6 and has a passage way 39 for the compressed air or air-gaseous mixture. The posterior portion of the piston 4 is closed down to the hub which has an opening for the rotor, The pistons are mounted with a space between for oil 45 which is sealed off from the cylinder chambers and compression chambers by seals 12 and rings 9. The space between the pistons vary due to the long expansion stroke and the short compression stroke. The square rotor 2 is located in the center of the double engine and is wide enough for the pistons 4 to reciprocate on. The rotor 2 is attached to the shaft 3 which is held in place by the bearings 11 and passes through the center of the head and sealed with seals 12.

FIG. 21 is a sectional view of a 4 cycle, 4 cylinder chambers, double engine with the piston 4 showing to illustrate the two cylindrical housing 1 with coolant channels 49 bolted 28 together with a gasket 44 between them and an oil passage 27. The heads 5 are bolted to the housing 1 and has an intake passage 22, fuel injection port 14, spark plug port 33, a passage for the shaft 3, exhaust ports 32, coolant inlet 16, coolant exit 17 and an inner circular wall 48. The inner peripheral wall of the head 5 has arcuate minimum and maximum recesses to produce a wavy surface with longer expansion stroke surface 29 and shorter compression stroke 30 surface. The pistons 4 are rotary and reciprocally mounted in the housing 1 and reciprocally mounted on the rotor 2 and rotates with the rotor 2. The anterior piston is mounted with the crest of the waves of the piston fit into the minimum arcuate depressions of the head and the posterior piston 4 is mounted where the crests of the waves of the piston 4 are opposite to the maximum arcuate recesses 64 of the head. The pistons 4 have guide grooves 18 and the housing 1 has stationary guide bolt 19 which guides the rotary and reciprocal movements of the pistons 4. The cylinder chambers 35 and compression chambers 6 are sealed by rings 9 and seals 7, 8 on the pistons.

FIG. 22 is a plan view of a head 5 of a 2 cycle, 2 cylinder chambers, engine illustrating the wave inner peripheral wall with a minimum arcuate recessed area 66 and a maximum arcuate recessed area 65, with the surface 24 of the wave between the minimum arcuate recessed area 64 and the maximum recessed area 65 being longer to produce a longer expansion stroke 29 area, and the wave between the maximum recessed area 65 and the minimum recessed area 64 being shorter to produce the compression stroke 30 area. The inner wall 48 has an air passage 39 and a ring 9 groove.

FIG. 23 is a plan view of the posterior wall 21 which has an air and/on air-fuel passage 20 and a circular center area for holding the bearing 11.

FIG. 24 is a sectional view of a 2 or 4 cycle, 2 cylinder chambers, engine wherein the fixed housing 1 and head 5 have fins 59 for cooling. It illustrates the location of the spark plug port 33, the exhaust port 32, and the cylinder chambers 35, which are divided sealed cylinder chambers by the seals 7,8 and rings 9, and the shape of the arcuate recesses of the head 5 shows the long expansion stroke 29 and the shorter compression stroke 30. This view shows the exterior of the piston 4 with its rings 9, guide groove 18 with the stationary guide bolt 19 which is attached to the housing 1. The piston 4 reciprocates on the non-round rotor 2 which is attached to the shaft 3. The shaft extend out of the head 5 and posterior wall 21. The posterior wall 21 is bolted 28 to the housing and has intake passage 20 for air or an air-gaseous mixture which passes through the one way valve 15 into the posterior compression chamber 6.

FIG. 25, FIG. 26 and FIG. 27 are external plan views of single rotary-reciprocal engines. FIG. 25 is a plan view of the housing 1 of a 2 cycle, 2 cylinder chambers, engine having a carburetor 63 to supply the air-fuel air mixture. The cylindrical housing 1 is stationary and has an exhaust system 32 and a stationary guide bolt 19 shown. The head is bolted 28 to the housing 1. The head has spark plugs 47 and the shaft 3 extending through the center of the head. The posterior wall 21 is bolted 28 to the housing 1 and contains an intake 20 for the air-gaseous mixture from the carburetor 63. The head has a coolant intake 16 and an outlet 17. FIG. 26 is a plan view of the housing 1 of a 2 cycle, 3 cylinder chamber, engine with fuel injection system 14 for the fuel intake system 31. The stationary cylindrical housing has an exhaust outlet 32 and a station guide bolt 19. The head 5 is bolted to the housing 1 and has a coolant inlet 16 an outlet 17, fuel intakes 31 with a fuel injection system 14 and spark plugs 47. The shaft 3 passing through the center of the engine and extending out. FIG. 27 is a plan view of the housing 1 of a 4 cycle, 4 cylinder chambers, engine with fuel injection. The stationary cylindrical housing 1 shows two stationary guide bolts 19. The head 5 is bolted 28 to the housing 1 and has a coolant intake 16 and outlet 17, exhaust systems 32, fuel injections 14, spark plugs 47 and the shaft 3 passing though the center of the head. The posterior wall 21 is bolted 28 to the housing 1 and contains an air passage 20, a central holding space for the bearings 11. The shaft 3 passes through the center of the posterior wall 21.

FIG. 28 and FIG. 29 are plan views of the cylindrical pistons with wavy front peripheral wall. FIG. 28 is a plan view of a cylindrical piston of a 2 cycle or 4 cycle, 4 cylinder chambers, engine. The anterior wall of the piston is thick and wavy with a hallow center and the posterior wall of the piston extends down at 90 degrees to the center hub where a passage way is left for the rotor 2. The expansion stroke area 29 is longer the compression stroke area 30 thereby giving a longer rotation on combustion and a shorter rotation on compression. The expansion stroke area starts at the crest of the wave and extends down to the trough of the wave and the compression stroke starts at the trough of the wave and extends to the crest of the next wave. There are seals 8, 7 on the crest of the waves and ring 9 groove on the peripheral area of the piston 4. The piston has a guide groove 18 which has the same shape and size waves as the front of the piston and acuate recesses on the head 5. FIG. 29 is a plan view of a cylindrical piston 4 of 2 cycle or 4 cycle, 2 cylinder chambers, engine. The anterior wave surface is thick and has a hallow center. The wave surface has a long expansion stroke area 29 and a shorter compression stroke area 30. The piston 4 has seals 7,8 and ring 9 grooves. There is a guide groove 18 on the peripheral area of the piston 4 which has the same size and shaped waves as the anterior waves on the piston and the arcuate recesses on the head 5. The posterior wall extends toward the center of the piston at 90 degrees to a hub and leaves a center opening in the hub for the rotor 2.

FIG. 30, FIG. 31 and FIG. 32 are views of a 2 cycle, 2 cylinder chambers, engine with the lower cylinder wall projecting forward.

FIG. 30 is a frontal view of a 2 cycle, 2 cylinder chambers, engine with a cylindrical chamber projecting forward. It illustrates the location of the spark plug port 33, the fuel injection port 14 and the shaft 3. FIG. 31 is a cross section view of a 2 cycle, 2, 4, 6 or 8 cylinder chambers, engine. The cylindrical stationary housing 1 has coolant passages 47, an exhaust outlet 32 and is lined with a cylinder liner 13. The head 5 has coolant passagesand an inlet 16 and fan outlet 17. There are fuel intakes 31 in the form of a fuel injection system 14 in the head 5. The head protrudes out front and forms a cylindrical cavity with an inner circular wall 48 and forms a central chamber for oil 45. In the center of the head is an opening for the shaft 3 which protrudes out and is held in place by a bearing 11,and the opening is sealed off by a seal 12. The cylindrical piston 4 is rotary and reciprocally mounted in the housing 1 and reciprocally mounted on the rotor 2 and rotates with the rotor 2. The anterior wall of the peripheral portion of the piston 4 is thick and wavy. The inner wall protrudes forward into the circular cavity in the head, The inner wall of the piston 4 forms a cylindrical chamber in the central anterior area of the piston for oil 45. The posterior wall of the piston 4 extends toward the center of the piston at 90 degrees to hub, which has a opening for the rotor 2, and reciprocates on the rotor 2. The peripheral wall of the piston 4 has rings 9 and seals 7, 8 on crest of the piston's waves to seal the cylinder chambers 35, posterior compression chamber 6 and central oil chamber 45. The peripheral wall of the piston 4 has a guide groove 18 for guiding the reciprocal and rotary motions of the piston 4. The piston 4 has oil passages 27 and air passages 39 for the compressed air from the compression chamber 6 to enter the expanded cylinder chambers. The posterior wall 21 is bolted 28 to the housing and has an air passage way 20 through opening 22. The air passes through the one way valve 15 into the posterior compression chamber. The posterior wall 21 hold the centrally located shaft 3 in place with a bearing 11 and the shaft 3 extends through the posterior wall 21. The non-round, centrally located rotor 2 is attached to the shaft 3 and rotates with the piston 4 and shaft 3.

FIG. 32 is a sectional view of a 2 cycle, 2 cylinder chambers, engine, giving a view of the external surface of the piston, with fuel injection. The front of the head 5 extends out front. The stationary cylindrical housing 1 has passages for coolant and an exhaust port 32. The inner wall of the housing is lined with a cylinder liner 13. The head 5 is bolted 28 to the housing and has passage ways for the coolant with an inlet 16 and an outlet 17, spark plugs port 33 and fuel intake ports 31 with fuel injection system 14. The head has a cylindrical wall that extends out front and the shaft 3 protrudes out of the center of it. The peripheral inner wall of the piston 4 has arcuate recesses, which the exterior surface 24 of the arcuate recessed has a longer surface area for the expansion stroke 29 than the recessed area for the compression stroke 30. The compression stroke 29 starts at the minimum recesses area 66 and goes to the maximum arcuate recessed area 65, and the compression stroke starts at the maximum recessed area 65 then goes to the minimum recessed area 66. The cylinder chambers is formed between the arcuate recessed areas of the head 5 and the anterior wavy area of the piston 4. The cylindrical piston 4 is rotary and reciprocally mounted in the housing 1 and reciprocally mounted on the rotor 2. The piston has rings 9, seals 7,8 and other seals 12 which seal the cylinder chambers, posterior compression chamber and anterior central oil chamber 45. On the peripheral area of the piston 4 there is a guide groove 18 along with the guide bolt 19, which guides the rotary and reciprocal motions of the piston while keeping the seals against the head at all times. The posterior wall of the piston, 4 extends toward the center of the piston and an opening is left for the piston to reciprocate on the rotor 2. The posterior wall 21 has an air passage 20 and a one way valve 15 for the air to flow into the posterior compression chamber 6. The shaft 3 extends through the center of the posterior wall.

FIG. 33 is a plan view of a piston, with the cylindrical lower piston wall extending forward, of a 2 or 4 cycle, 4 cylinder chambers, engine. The anterior portion of the piston's cylindrical lower has an air passage 39, rings 9 and 4 seals 7. The peripheral anterior wall has a wavy surface 25 with seals 7,8 on the crest of the waves. The wave surface 25 between the crest of the wave and the trough of the wave is a longer surface which is the expansion stroke 29 and the wave surface between the trough of the wave and the crest of the wave is shorter and is the compression stroke 30 area. In the anterior center of the piston there is a chamber. The posterior wall of the piston 4 extend toward the center at 90 degree down to a hub leaving a opening for the piston to reciprocate on the rotor 2. The peripheral area of the piston 4 has ring 9 grooves and a guide groove 18 which has longer expansion strokes 29 and shorter compression strokes 30. On each crest of the 4 waves there are seals 7, 8.

FIG. 34 is a plan drawing of a 2 cycle or 4 cycle, 2 cylinder chambers, engine with the piston's lower cylindrical wall extending forward with the anterior central portion being a circular hallow chamber, and the wall has rings 9, air passages 39 and 2 seals 7. The anterior peripheral wall of the piston 4 has a wavy surface, and on the 2 crest of the waves are seals 7, 8. The portion of the wave from the crest to the trough of wave is the longer expansion stroke 29, and from the trough of the wave to the crest of the wave is the shorter compression stroke 30. The posterior wall extend toward the center of the piston 4 at 90 degrees to a hub which has an opening for the piston to reciprocate on the rotor 2.

FIG. 35 is a plan view of a 2 or 4 cycle, 4 chambers, head 5 of a rotary-reciprocal engine which illustrates the arcuate recesses on the posterior peripheral wall of the head 5, and that the recesses wavy surface 24 has a minimum recessed area 66 and a maximum recessed area 65. The wavy surface 24 from the minimum recessed area 66 to the maximum recessed area 65 is longer and gives a longer expansion stroke 29 and from the maximum recessed area 65 to the next minimum 66 recessed are is shorter to give a shorter compression stroke 30. There is a circular chamber between the recessed wall 24 and the inner circular wall 48 which extends forward for the inner wall of the piston to rotate and reciprocate in. The inner cylindrical wall is hallow in the posterior portion. FIG. 36 is similar to FIG. 35 except that it is a 2 or 4 cycle, 2 cylinder chambers, head 5. It also has a longer expansion stroke area 29 and a shorter compression stroke area 30.

FIG. 37 is a frontal view of a 4 cycle, 4 cylinder chambers, engine with fuel injection and the inner circular wall protrudes out front. It illustrates the position of the exhaust ports 32, fuel injection ports 14, spark plug ports 33, the shaft 3 and the circular inner front that protrudes out front.

FIG. 38 is a cross section of a 4 cycle, 2, 4, 6, or 8 cylinder chambers, engine with fuel injection and the front protruding forward. The cylindrical housing is lined with a cylinder sleeve 13, has coolant passages 49, oil passages 27, The cylindrical piston 4 is rotary and reciprocally mounted in the housing 1 and reciprocates on the rotor 2 and rotates with the rotor 2. The anterior inner wall of the piston 4 protrudes forward and form a circular chamber 45 in anterior and center portion of the piston which contains oil. The piston 4 has an air passage way 39 from the posterior compression chamber 6 extending to the front of the piston 4 and into the cylinder chambers 35 when the cylinder chamber 35 is expanded. The piston 4 has oil passages 27 to lubricate the peripheral area of the piston 4. The posterior wall of the piston 4 extends to the center at 90 degrees and forms a central hub which has an opening for the rotor 2. The anterior inner cylindrical wall of the piston 4 has rings to seal the anterior portion of the cylinder chambers. The piston has seals 7,8, rings 9 and seals 12 to seal off the cylinder chambers 35 and front chamber 45 and posterior compression chamber 6. The head 5 is bolted to the housing 1 and has cooling channel with an inlet 16 and an outlet 17. The head 5 has fuel injection ports 14, spark plug ports 33 and air passages 39. The anterior circular wall of the head 5 which protrudes anteriorly contains a circular cavity in which the anterior inner wall of the piston 4 rotates and reciprocates in. In the center of the head the shaft 3 passes through it, and is held in place with a bearing 11 and seal 12. The posterior wall 21 has an air passage in which air is drawn into the posterior compression chamber 6 through a one way valve 15. The shaft 3 passes through the center of the posterior wall 21, and is held in place with a bearing 11 and a seal 12.

FIG. 39 is a sectional view of a 4 cycle, 4 cylinder chambers, engine with fuel injection and the inner circular wall protrudes forward. It has the cylindrical housing cut away showing the cooling channels 49, the oil passage 27 and the peripheral surface of the piston. The cylindrical piston 4 is rotary and reciprocally mounted in the housing 1. It has a wavy anterior peripheral area which has longer expansion surface 29 than compression surface 30. The piston has seats 7, 8 and rings 9 to seal off the cylinder chambers and the posterior compression chamber 6. The piston 4 has a guide grove 18 shaped like the wavy anterior surface of the piston 4, and the stationary guide bolt 19 holds it in position. The cylindrical head 5 has cooling channels 49, fuel injection ports 14, spark plug ports 33 and the arcuate recesses in the peripheral posterior area which have a longer expansion surface 29 and a shorter compression surface 30, The head 5 is bolted to the housing 1. The piston reciprocates on the rotor 2 and rotates with it. The rotor 2 is attached to the shaft 3. The shaft 3 protrudes though the anterior 5 and posterior wall 21. The posterior wall 21 has an air passage 20, which passes the air into the posterior chamber 6 through a one way valve 15.

FIG. 40 is a plan view of a 2 cycle, 2 cylinder chambers, head 5 of a rotary reciprocal engine with the inner circular wall protruding forward. Between the inner circular wall and the inner wall 48 is a circular chamber for the inner wall of the piston 4 to rotate and reciprocate in. The posterior peripheral wall 24 has arcuate recesses, wherein the least recessed area 66 and the most recessed area 65 forms the arcuate surface, wherein the surface from the least recessed area to the most recessed area 65 is the longer expansion stroke 29 and the surface from the most recessed area to the least recessed are is the shorter compression stroke 30. The cylindrical inner wall 48 of the head 5 extends posterior from the arcuate recesses and is hallow inside to for the anterior chamber for oil 45.

FIG. 41 is a plan view of a 4 cycle, 4 cylinder chambers, double engine with fuel injection in both engines. The two engines are bolted 28 together and has one long shaft 3 which protrudes out the center of the heads 5 of the engine. The cylindrical housing 1 has stationary guide bolts 19 in both housings. Each engine has two exhausts 32 and two fuel injection ports 14. The heads 5, gasket 44 on each engine has two spark plugs 47.

FIG. 42 is a plan view of a 2 cycle, 2 cylinder chambers, engine with fuel injection and the inner circular wall protrudes forward. The head 5 and posterior wall 21 is bolted 28 to the cylindrical housing 1. The housing has two exhaust systems 32 and guide bolts 19. The head 5 has two injection ports 14 and two spark plugs 47. The posterior wall has an air intake 22 for the posterior compression chamber. The shaft 3 extends out from the center of the head 5 and posterior wall 21.

OPERATION

The 2 cycle, 2 cylinder chambers, rotary-reciprocal engines of FIG. 7, 8, 15, 16, 18, 19, 24, and 25 operates with the shaft 3 rotating in the clockwise direction, and starting from the position of the piston 4 Illustrated In FIG. 8 is in position wherein the waved front portion of the piston 4 waves are in place between the front inner cylinder wall recesses, and the cylinder chamber space 35 is at its minimum volume, the piston 4 rotary and reciprocal movement is controlled by means of the stationary rotary-reciprocal guide bolt 19, which is in contact with the waved side wall of the rotary-reciprocal guide groove 18, and has the same shape as the wavy anterior surface of the piston 4. The piston 4 encloses together with the contact on runner surface of the housing 1 has a working on combustion space 35 which increases during further rotation and reciprocation of piston 4 in the clockwise direction and, for example, compresses the fuel-air, oil mixture, which has been previously vacuumed in from a carburetor 63 into the posterior compression chamber 6, and increases the cylinder chamber 35 space as the piston 4 reciprocates to the posterior aspect (dead center) of the cylinder chamber 35 and rotates the distance of the long compression stroke 29. The exhaust port 32 becomes open and the inlet port become open, and the compressed fuel-air, oil mixture from the posterior compression chamber 6 fills the cylinder chamber 35. On further clockwise rotation the piston 4 is guided to reciprocate toward the front of the engine, while rotating the distance of the compression stroke 30 and deceasing the volume of the cylinder chamber 35, thereby rotating a total of 180 degrees, while compressing the fuel-air, oil mixture to its minimum volume at then at the termination of the shorter forward stroke (compression stroke 30) the mixture is ignited by means of spark plug 47. While the shorter forward stroke is compressing the mixture, a new fuel-air, oil mixture is been aspirated from a carburetor 63 into the posterior compression chamber 6. The piston 4 is being pressed by the combustion gasses, with simultaneous guided rotation and reciprocation of the piston, and compression gases of the gaseous mixture in the posterior compression chamber 6, until the piston is reciprocated posteriorly to its maximum reciprocation motion (dead center position), and has rotated to the end of the longer compression stroke 30, therefore reaching the exhaust port 32, and exhaust gases begin to exit on the peripheral side of the piston 4. The inlet port 31 is opened on the central side of the piston 4, thereby allowing the compressed fuel-air, oil mixture fill the cylinder chamber 35 through passage 39 and push the remaining burnt gases out of the cylinder chamber 35. The 2 cycle 4 cylinder chambers, rotary-reciprocal engine rotates 90 degrees with the expansion stroke 29 and the shorter compression stroke 30 and has 4 ignitions, by a spark plug in each cylinder chamber, per rotation of 360 degrees.

A 2 cycle, 2 cylinder chambers, engine with fuel injection as in FIG. 15, 31 and 32 operates the same as the 2 cycle, 2 cylinder chambers, engine except that only air is compressed in the posterior compression chamber 6. The fuel is injected by the fuel injection system 14 directly into the cylinder chambers 35 after the exhaust port 32 and the air passage 39 are closed. The engine is lubricated by oil from the anterior central chamber 45 through oil passages 27.

A 2 cycle, 3 cylinder chambers, engine as in FIGS. 10, 11, 20 and 26 is started by rotation the shaft 3 clockwise, and when the crest of the waves of the piston 4 are located in the minimum arcuate recess of the head 5, the cylinder chamber is at its smallest volume, then as the piston is rotated clockwise the piston's seals 8 follow along the longer expansion surface 29 of the arcuate recesses 24, and the cylinder chambers expands in volume. The rotary and reciprocal motions are controlled by the guide groove on the piston 18 and the stationary guide bolt 19 on the housing 1 which fits down into the guide groove. The guide groove guides the piston to rotate and reciprocate posteriorly on the rotor 2 while rotating with it, thereby compressing the posterior chamber 6, and the cylinder chambers are expanding. When the piston is rotated and reciprocated to the end of the long expansion stroke 29 (dead center) the piston is then rotated and reciprocated anteriorly, thereby compressing the cylinder chambers and expanding the posterior compression chamber, which vacuums in a fuel-air mixture from the carburetor 63. At the end of the shorter compression stroke, 30 a new expansion stroke is started, and the piston rotates and reciprocates posteriorly thereby compressing the fuel-air and oil mixture, then when the piston is at the end of the expansion stroke exhaust ports and intake ports are open. The compressed fuel-air and oil mixtures passes thru the passage way 39 from the posterior compression chamber 6 and enters the cylinder chambers 35, then as the piston rotates a new compression stroke is started and the exhaust and inlet ports are closed, then the fuel-air mixture is compressed. At the end of the shorter compression stroke the compressed air-fuel mixture in the 3 cylinder chambers are exploded by the 3 spark plugs. The expanding hot gas pushes the piston 4 forcing it to rotate and reciprocate as guided by the guide groove 18 and stationary guide bolt 19 and at the same time compressing the posterior compression chamber. The seals 8 remain in contact with the recessed surface 24 of the head at all times. At the end of the expansion stroke (dead center) the exhaust ports and inlet ports are opened. The exhaust gases from the 3 cylinder chambers passes out the exhaust ports in the housing and the compressed fuel-air and oil mixture enter into the cylinder chamber through the passage 39 form the posterior compression chamber and help push out the exhaust gases. At the end of the expansion stroke 29 the piston is rotated and reciprocated anteriorly, and the fuel-air and oil mixture is compressed by a shorter compression stroke 30, then at the end of the compression stroke 30 the 3 spark plugs 47 are fired thereby starting a new cycle. The 3 spark plugs 47 are fired every 120 degrees of rotation. The engine may be lubricated by oil from the anterior central chamber 45 through oil channels 27.

The 2 cycle, 3 cylinder chambers, engine with fuel injection operate similar to the 2 cycle, 3 cylinder chambers, engine except that the fuel is injected directly into the cylinder chambers during the compression stroke after the exhaust and intake ports are closed. The posterior compression chamber 6 vacuum in air, and is compressed in the posterior compression chamber 6 then passed through passage channel 39 to the cylinder chambers 35, when the piston is at dead center. It assists in removing the exhaust gases and supplies the air for the fuel-air mixture. The engine is lubricated by oil from the anterior central chamber 45 through oil passages 27. The 3 spark plugs 47 are fired every 120 degree rotation of the piston 4 when the fuel-air mixture is compressed to its maximum in the 3 cylinder chambers 35. There are 3 exhaust ports 32, 3 or more spark plugs 47 and 3 or more air inlets 39. The shaft 3 is rotated clockwise, and the posterior compression chamber 6 vacuums in air as the piston 4 is rotated and reciprocated anteriorly as guided by the rotary reciprocal guide over the shorter compression stroke 30. After the end of the compression stroke 30, the piston is guided to rotate and reciprocate posteriorly through the expansion stroke 29 and the air in the posterior chamber 6 is compressed. At the end of the expansion stroke 29 the air passage 39 and exhaust port 32 are opened. The air passes into the cylinder chamber 35 and assist in the removal of the exhaust gases and supplies air for the fuel-air mixture. The piston is guided to reciprocate and rotate anteriorly, then the exhaust and inlet ports are closed, and the fuel from the fuel injectons 14 is injected into the 3 cylinder chambers. The fuel-air mixture is compressed to its maximum and the 3 spark plugs 47 are fired thereby starting a new cycle. The engine is cooled by a coolant system 49 or by air fins 59. The 2 cycle, 4, 5 and 6 cylinder chamber engines operates the same as the other 2 cycle rotary-reciprocal engines except that they have more cylinder chambers 35 which fires at the same time. Each cylinder chamber has a spark plugs 47, a exhaust ports, one or more air-fuel 39 or air 39 and fuel inlets ports 31. The 2 cycle rotary-reciprocal engines may have as many cylinder chambers 35 as desired with each having an exhaust port, fuel intake port 31, air intake port 39 and a spark plug 47.

The 4 cycle rotary-reciprocal engines with longer expansion strokes 29 and shorter compression strokes 30 are shown in FIGS. 1, 2, 3, 4, 5, 9, 33, 37, 38 and 39. The 4 cycle, 2 cylinder chambers, rotary-reciprocal, engine of FIGS. 2, and 14 operates with piston 4 rotating in the clockwise direction and starting from the position of the piston 4 illustrated in FIG. 2. It is in position wherein the waves' crest of the piston 4 is in place between the arcuate recesses of the front inner cylinder wall, and the cylinder chamber 35 space is at its minimum volume. The piston is controlled by means of a stationary rotary-reciprocal guide bolt 19, which is in contact with the waved side wall of the rotary-reciprocal guide groove 18, and has the same wave shape as the waved front surface 25 of the piston 4, and the same shape as the arcuate recesses 24 of the front inner wall of the cylinder chamber. The piston 4 encloses together with the contact or runner surface of the engine housing, a working on combustion space (cylinder chamber 35), which increases during rotation and reciprocation of the piston 4 in the clockwise direction and, for example, draws in fuel-air mixture for intake port 31. As soon as the piston 4, after an angular rotation of piston 4 and posterior reciprocation of piston 4, arrives in the posterior dead center position therefor, the longer suction stroke 29 is terminated and there commences the shorter compression stroke 30 of the enclosed fuel-air mixture. After a further rotation of the piston 4, rotor 2 and shaft 3 to 180 degrees and reciprocation of the piston forward to the inner arcuate recesses 24 of the front cylinder chamber wall, the compression stroke 30 of the piston 4 is terminated, and the fuel-air mixture is compressed thereby is ignited by means of spark plug 47. The piston 4 is thereby pressed, with simultaneous rotation and posterior reciprocal of the piston, into near posterior dead center position, thereof whereupon the piston 4 opens up the exhaust port 32 in the head 5 so that the burnt gases may be discharged. During the previous described suction stroke 29 which takes place in cylinder chamber 35, an ignited gaseous mixture expansion stroke 29 takes place in the other cylinder chamber, then during the previous described compression stroke 30, in one cylinder chamber an expelling of the exhaust fumes takes place, and in the other chamber the air-gases mixture is being compressed. During the previous shorter compression stroke 30 air was drawn into the posterior compression chamber 6 through the air passage 20 then compressed during the longer expansion stroke 29. The compressed air passes through the air passage 39, and at the dead center position the air passage 39 opens and the compressed air passes into the cylinder chamber to assist in removing the exhaust gases, and supplies the air when a fuel injection system is used. There are 2 ignitions of the fuel-air mixture by one spark plug 47, in cylinder chambers per 360 degree rotation.

The 2 cycle, 3 chambers, rotary-reciprocal engine of FIG. 20 has a longer expansion and suction stroke 29 and a shorter compression and exhaust stroke 30. One cylinder chamber functions as the ignition and expansion chamber, one cylinder chamber functions as the exhaust chamber and the other chamber functions as the air-fuel inlet chamber. Air is vacuumed into the posterior compression chamber on the strokes of compression and exhaust stroke. It is then compressed on the expansion and suction stroke. At the end of the expansion stroke 29 the air inlet opens and the compressed air flows into the exhaust chamber. If fuel injection is used the air also flows into the cylinder chamber, then after the exhaust port and air inlets are closed, fuel is injected into cylinder chamber, where it is compressed then fired in one cylinder chamber 35. The hot gases push the piston 4 to rotate in the housing 1 and reciprocate posteriorly on the rotor 2 as controlled by the rotary-reciprocal guide groove and guide bolt 19 to the end of the expansion stroke 29 (dead center). This posterior reciprocation compresses the air in the compression chamber 6. At the end of the longer expansion stroke the exhaust ports 32 in the head 5 and air inlet passages 39 are opened to the cylinder chamber. The air assists in pushing out the exhaust gases along with the shorter compression of this chamber. The piston 4, rotor 2 and shaft has rotated 120 degrees. The 4 cycle, 4 chambers, rotary-reciprocal engine of FIGS. 1, 2, 3, 4, 5, 9, 23, 28, 33, 37, 38 and 39 has the same longer suction (expansion) stroke 29, shorter compression stroke 30, expansion stroke 29 and exhaust stroke (shorter compression stroke 30) as described for the 4 cycle, 2 chamber, rotary-reciprocal engine, except that two strokes of each are taken place at the same time, and there are 4 double ignition per 360 degrees of rotation. During the compression and exhaust stroke air is vacuumed into the posterior chamber, and during expansion and suction stroke, the air in the posterior compression chamber 6 is compressed. When the piston 4 is at dead center the compressed air passes through passage 39 and into the cylinder chambers to assist in removing the exhaust gases and to supply air when an injection system is used. In 4 cycle, 4 cylinder engines with fuel injection systems 14 the compressed air is also passed into the other two cylinders and when the exhaust port and air passages 39 are closed the fuel is injected into two chambers and mixed with the air to form the fuel-air mixture. The fuel-air mixture is then compressed and fired by the two spark plugs 47. This engine has spark plugs in two of the cylinder chambers and are fired together.

The 4 cycle, 3 chambers, rotary-reciprocal engine has an addition chamber where the compressed fuel-air mixture is decompressed then recompressed before ignition takes place in order to heat the fuel-air mixture. The other two chambers function the same as that described above for a 4 cycle, 2 chambers rotary-reciprocal engine and has two ignitions per 360 degrees of rotation. The 4 cycle, 6 chambers engine FIGS. 2, and 38, strokes of suction, fill 3 cylinder clambers. The strokes of compression compress 3 cylinder. The strokes of expansion expand the ignited gas in 3 cylinder chambers. The strokes of exhaustion exhaust 3 cylinder chambers 35 at the same time. It also has 3 spark plugs 47 which ignite the compressed fuel-air mixture in the 3 cylinder chambers at the same time, and has 6 triple ignitions per 360 degrees of rotation.

Double 2 cycle, 2 cylinder chamber, rotary-reciprocal engine operates the same as the single 2 cycle, 2 cylinder chambers, rotary-reciprocal engine described above except that the engine of FIG. 17 doesn't have posterior compression chamber. It has a central compression chambers 6 which draws in the fuel-air, oil mixture thru the inlet 22 and passage 39, and compresses the fuel-air, oil mixture, or the engine is lubricated by the oil in the chamber between the engines 45. The two piston reciprocate on the rotor 2 at a slightly different rate because the expansion strokes 29 is longer than the compression stroke 30. When one piston is at dead center the other piston cylinder chambers are at their minimum volume. The central compression chamber 6 of the anterior engine, communicates with the cylinder chamber 35 of the posterior engine and the central compression chambers 6 of the posterior engine communicates with the cylinder chambers of the anterior engine. The housing 1, and piston so attached and mounted, as in FIG. 17, so that the cylinder chamber 35 volume of the anterior engine is at its minimum and the cylinder chamber 35 volume of the posterior engine is at its maximum, (at dead center) and allows exhaust gases to flow out exhaust port 32. The compressed fuel-air mixture from the anterior central chamber of the anterior engine passes into the cylinder chamber 35 of the posterior engine. The stroke of expansion in the cylinder chamber 35 of the anterior engine takes place at about the same time as stroke of compression in the cylinder chamber 35 of the posterior engine. The then the stroke of expansion of the cylinder chamber of the posterior engine takes place at about the same time as the stroke of compression of the cylinder chamber of the anterior engine, when pistons 4, rotors 2 and shaft 3 are rotating clockwise.

The strokes of intake and exhaustion are done when the pistons are at dead center (maximum posterior reciprocation), The ignition of the mixture in the cylinder chamber 35 of anterior engine takes placed by means of a spark plug 47, and the piston 4 is thereby pressed and simultaneous reciprocation of the pistons 4, rotor 2 and shaft 3 to the end of the longer expansion stroke 29 at dead center, at about the same time compressing the fuel-air, oil mixture in the cylinder chamber of the posterior engine. The expanded burnt gases is exhausted from the cylinder chamber 35 of anterior engine and the compressed fuel-air mixture from central compression of the posterior engine flows into the cylinder chamber of the anterior engine. The compressed fuel-air, oil mixture in cylinder chamber 35 of the posterior engine is ignited by means of a two spark plugs 47. The piston 4 is thereby pressed, with simultaneous reciprocation and rotation of the piston 4, rotor 2 and shaft 3 to the end of the longer expansion stroke 29 (dead center), at the same time compressing the fuel-air, oil mixture in the cylinder chamber of anterior engine. The expanded exhaust gas passes out through the exhaust port 32, and the compressed fuel oil mixture from the central compression chamber of anterior engine flows into the cylinder chambers of the posterior engine. When a fuel injection system is used only air is passed from the opposite central compression chamber, to the cylinder chamber and the fuel is injected directly into the cylinder chamber after the exhaust and air intake is closed. There are two ignition per cylinder chamber in each engine (total of 8) per 360 degrees of rotation.

Double 4 cycle, 2 or more cylinder chambers, rotary-reciprocal engine of FIGS. 17, 21 and 41 operates the same as the single 4 cycle 2 or more cylinder chambers, rotary-reciprocal engine described above except that the double engine does not have posterior compression chamber. The housings 1 of the anterior and posterior engines are bolted together and the pistons 4 are so attached and mounted, as in FIG. 17, so that the cylinder chamber's volume of the anterior engine is at its minimum volume, and the cylinder chamber's volume of the posterior engine is at its maximum volume (at dead center or maximum posterior reciprocation). Both pistons 4 are mounted on one rotor 2 and reciprocates on it, and the rotor is attached to a shaft 3. The stroke of expansion in the anterior engine takes place at about the same time as the stroke of compression takes place in the posterior engine's cylinder chambers 35, when the pistons rotates clockwise. In the other cylinder chamber of the anterior engine the stroke of suction take place, and in the other cylinder chamber of the posterior engine the stroke of exhaustion takes place at the about same time. The ignition of compressed fuel-air mixture in the cylinder chamber 35 of anterior engine takes place by means of a spark plug 47 which is located in every other cylinder chamber, and the piston 4 is thereby pressed and simultaneous reciprocation and clockwise rotation takes place. The posterior engine's piston goes from dead center, and compresses aspirate fuel-air mixture while at the same time in the other cylinder chamber of anterior engine a fuel-air mixture is aspirated through inlet port 31. It the other cylinder chamber 35 of the posterior engine the expanded exhaust gases are exhausted through the exhaust port 32. Each piston 4 of the engine has a rotary-reciprocal guide 18 with a guide bolt 19 which govern the rotary-reciprocal motion of each piston 4. There are two ignitions for each motor (total of 4) per 360 degree of engine shaft rotation.

Double 4 cycle, 4 cylinder chambers, rotary-reciprocal engine of FIGS. 17, 21, 41 operates the same as the 4 cycle, 2 cylinder chambers, rotary-reciprocal engine described above except that there are two cylinders chambers 35 for the each strokes of aspiration and expansion and two cylinders chambers 35 for each of the strokes of compression and exhaustion in each engine. There are two spark plugs 47 igniting at the same time on each engine and the spark plugs 47 are located opposite each on each engine in every other cylinder chamber to balance the force applied to the pistons 4. The engine's two spark plugs 47 in one engine fire every time the piston 4 rotates clockwise to 0 and 180 degrees. Then the other engine fires it two spark plug 47 at 90 and 270 degrees. There are 4 ignitions for each engine's two spark plugs 47 or a total of 16 ignitions per rotation of the pistons 4, rotor 2 and shaft 3.

Double 4 cycle, 3 cylinder chambers, rotary-reciprocal engine consisting of two 4 cycle, 3 cylinder engines and it operates the same as the double 4 cycle, 2 cylinder chambers, rotary-reciprocal engines described above except that each engine will have 3 cylinder chamber per each engine. One of the cylinder chambers would be used for double compressing the air-fuel mixture.

Double 4 cycle, 6 cylinder chambers, rotary-reciprocal engine consist of two 4 cycle, 6 cylinder chambers, rotary-reciprocal engines which operates the same as the 4 cycle, 2 cylinder chambers, rotary-reciprocal engine except that three cylinder chambers of each engine are ignited at the same time at every 60 degrees of the piston's rotation and the other engine is ignited 30 degrees of rotation later. The stroke of suction takes place in 3 of the cylinder chamber while the stroke of expansion takes place in the other 3 cylinder chambers, then the stroke of compression takes place in 3 of the cylinder chambers while the stroke of exhaustion takes place in the other three cylinder chambers of each engine. The anterior chamber vacuums in the air on the stroke of expansion and suction, then the air is compressed on the stroke of compression and exhaustion, and flows into the cylinder chambers at the end of the expansion and suction stroke.

It will be understood that various changes and modifications may be made in the construction described which provide the characteristics of this invention without departing from the spirit thereof particularly as defined in the following claims.

I claim:

1. An internal combustion engine of the rotary-reciprocal type comprising, a housing formed with peripheral wall with side walls which contains a cylindrical inner wall attached to one of said side wall at 90 degree, inner surface of said peripheral wall being cylindrical, a peripheral circular piston having anterior peripheral located equally spaced wave shaped anterior side wall with the first portion of the wave from the crest of the wave to the trough of the wave being longer than the second portion of the wave from the trough of the wave to the crest of the next wave, rotatably and reciprocal mounted in said housing, a rotor, having means for the said piston to reciprocate on and rotate with said rotor, said rotor is attached to a shaft, said shaft extending through said side walls and rotates with said rotor, said housing having a lateral and peripheral circular cylinder chamber having equally spaced arcuate recesses with the inner surface of the said arcuate recesses from the minimum recessed area to the maximum recessed area is a longer distance than the distance from the maximum recessed area to the minimum recessed area of said arcuate recesses, said arcuate recesses extending into said cylinder chamber's side wall, the number and shape of recesses being equal to the number and shape of the waves on the piston's anterior side wall and the number being 2 or more, piston's waves movably mounted in each of said arcuate recesses respectively, the piston's peripheral and inner circular surface remaining in sealing contact with the inner peripheral wall, the peripheral surface of the circular inner wall at all times and any seal on the crest of the wave of the piston remaining in sealing contact with the inner wall's peripheral surface, peripheral housing wall's inner surface and arcuate recesses of said side wall and forming variable volume cylinder chambers between the piston's waved side wall and said cylinder chamber walls, said housing being provided with means for admitting a gaseous mixture communicating with said cylinder chambers, means to discharge combustion products communicating with said cylinder chamber, ignition means communicating with said cylinder chamber, means to guide piston's rotary and reciprocal motions in said housing, said cylinder chamber of varying size enabling compression of a gaseous mixture to take place after suction, ignition of said compressed gaseous mixture and expansion of said chambers due to the pressure of said combustion products.

2. The engine according to claim 1, wherein the peripheral wall of said housing is provided with exhaust ports extending therethrough and the cylindrical inner wall of said housing is provided with intake ports extending therethrough, said ports being adapted to be opened or closed by said piston during rotation and reciprocation and constituting said means for admission of combustion mixture and means for discharging the combustion products.

3. The engine according to claim 1, wherein the arcuate recessed side wall of said housing is provided with exhaust ports extending therethrough and is provided with intake ports extending therethrough, said ports being adopted to be opened or closed by said piston during rotation and reciprocation and constituting said means for admission of combustion mixture and means for discharging the combustion products.

4. The engine according to claim 1, wherein a guide bolt is attached to the inner surface of the said peripheral housing wall and slides in a groove on the peripheral wall of the piston, said groove having waved side walls which are of the same shape and number as the waves on the side wall of the piston and constituting said means for guiding the piston's rotation and reciprocation.

5. The engine according to claim 1, wherein 1 or 2 compression chambers are formed between the piston and housing's side walls and providing with a one way inlet for oil, gaseous mixture and/or air to flow into the compression chamber then compressed and has means to deliver the oil, gaseous mixture and/or air to said intake port.

6. The engine according to claim 1, wherein the engine is cooled by a liquid cooling system.

7. The engine according to claim 1, wherein the engine is cooled by air flowing oven cooling fins.

8. The engine according to claim 1, wherein a side wall of the housing has two circular walls projecting outward which form a chamber for an outward projecting inner circular piston wall.

9. A rotary-reciprocal combustion engine having a cycle of two strokes, compression and expansion wherein exhaust and intake takes place at the end of the expansion stroke; said engine comprising:

a) a housing formed with a peripheral wall with side walls, a piston in said housing, the inner surface of said peripheral inner wall being cylindrical, said housing having a laterally and peripherally spaced cylinder chamber formed with walls consisting of the inner cylindrical surface of the peripheral housing wall, a peripheral area of one side wall and an inner circular wall attached to said front side wall of the housing and extending parallel with the peripheral wall toward the center of the housing thereby leaving space in the middle of the housing for the piston and rotor to rotate and reciprocate, said one side wall having equally spaced arcuate recesses projecting into the cylinder chambers, the arcuate recesses have a longer inner surface from the minimum arcuate recess to the maximum arcuate recess and shorter inner surface from the maximum arcuate to the minimum arcuate recess, said housing having an anterior central chamber and a posterior compression chamber separated by the piston and being provided with means for admitting oil, a gaseous mixture and/or air communicating with said cylinder chambers, means for discharging combustion products communicating with said cylinder chambers, said posterior compression chamber having means for admitting and discharging oil, a gaseous mixture and/or air;

b) said piston formed with a thick anterior peripheral wall and one side wall at 90 degrees to the peripheral wall, said peripheral wall is cylindrical, said thick peripheral wall is the anterior wall of the piston, having equally spaced waves on the said side wall of the piston, said waves being of equal number and shape as said arcuate recesses, wherein the number of waves and arcuate recesses is two or more, the piston having means to divide the housing's cylinder chamber into two or more sealed cylinder chambers, said piston's posterior wall extends at 90 degrees to peripheral surface of the piston, having a centrally located hub which has an opening in the center of the hub for reciprocating on the rotor and rotating with the rotor, the piston having means to divide the housings cylinder chambers into 2 or more sealed cylinder chambers, piston is rotatably and reciprocally mounted in said housing with the piston waves movably mounted in each of said arcuate recesses respectively remaining in sealing contact with said cylinder chamber walls;

c) a rotor; mounted in the center of the housing on the shaft and rotates with the shaft, said piston reciprocates on the rotor and rotates with the rotor;

d) a shaft; rotatably mounted in the center of the housing, with a rotor attached to the shaft, said shaft extends through the side walls of the housing;

e) a reciprocal and rotary guide having means to guide the piston's rotary and reciprocal motions while keeping the piston in continuous sealing contact with said cylinder chambers walls and varying the volume of the cylinder chambers enabling a compression of a gaseous mixture to take place after aspirating a gaseous mixture;

f) an ignition system having means for igniting compressed gaseous mixture and expansion of said cylinder chambers due to pressure of said combustion products.

10. The engine of claim 9 wherein the combustion fuel is injected directly into the cylinder chamber containing compressed air at the end of the compression stroke and before ignition by means of an air-assist direct injection system.

11. The engine of claim 9 wherein the piston has means for admitting compressed air from the posterior or anterior compression chamber to the cylinder chambers and wherein the combustible fuel is injected directly into the cylinder chambers containing compressed air after the compression stroke and before igniting by means of a direct injection system.

12. The engine according to claim 9 wherein the engine has 2 or more sealed cylinder chambers and the intake ports, exhaust ports and ignition system communicates with one half of the cylinder chambers.

13. A rotary-reciprocal combustion engine having a cycle which includes the four strokes of intake, compression, expansion and exhaustion, said engine comprising of:
  a) a housing formed with a peripheral wall with side walls, a piston in said housing, the inner surface of said peripheral inner wall being cylindrical, said housing having a laterally and peripherally spaced cylinder chamber formed with walls consisting of the inner cylindrical surface of the peripheral housing wall, a peripheral area of one side wall and an inner circular wall attached to said front side wall of the housing and extending parallel with the peripheral wall toward the center of the housing thereby leaving space in the middle of the housing for the piston and rotor to rotate and reciprocate, said one side wall having equally spaced arcuate recesses projecting into the cylinder chambers, the arcuate recesses have a longer inner surface from the minimum arcuate recess to the maximum arcuate recess and shorter inner surface from the maximum arcuate to the minimum arcuate recess, said housing having an anterior central chamber and a posterior compression chamber separated by the piston and being provided with means for admitting oil, a gaseous mixture and/or air, communicating with said cylinder chambers, means for discharging combustion products communicating with said cylinder chambers, said posterior compression chamber having means for admitting and discharging oil, a gaseous mixture and/or air;
  b) said piston formed with a thick anterior peripheral wall and one posterior side wall at 90 degrees to the peripheral wall, said peripheral wall is cylindrical, said thick peripheral wall is the anterior wall of the piston, having equally spaced waves on the said side wall of the piston, said waves being of equal number and shape as said arcuate recesses, wherein the number of waves and arcuate recesses are two or more, the piston having means to divide the housing's cylinder chamber into two or more sealed cylinder chambers, said piston's posterior wall extends at 90 degrees to peripheral surface of the piston, having a centrally located hub which has an opening in the center of the hub for reciprocating on the rotor and rotating with the rotor, the piston having means to divide the housings cylinder chambers into 2 or more sealed cylinder chambers, piston is rotatably and reciprocally mounted in said housing with the piston waves movably mounted in each of said arcuate recesses respectively remaining in sealing contact with said cylinder chamber walls;
  c) a rotor; mounted in the center of the housing on the shaft and rotates with the shaft, said piston reciprocates on the rotor and rotates with the rotor;
  d) a shaft; rotatably mounted in the center of the housing, with a rotor attached to the shaft, said shaft extends through the side walls of the housing;
  e) a reciprocal and rotary guide having means to guide the piston's rotary and reciprocal motion while keeping the piston in continuous sealing contact with said cylinder chambers walls and varying the volume of the cylinder chambers enabling a compression of a gaseous mixture to take place after aspirating a gaseous mixture;
  f) an ignition system having means for igniting compressed gaseous mixture and expansion of said cylinder chambers due to pressure of said combustion products.

14. The engine of claim 13 wherein the combustible fuel is injected directly into the cylinder chambers containing compress air after the compression stroke and before the ignition by means of a direct injection system.

15. The engine of claim 13 wherein the engine has 2 or more sealed cylinder chambers and the intake ports, exhaust ports, and ignition system communicates with one half of the cylinder chambers.

16. The engine according to claim 13, wherein a side wall of the housing has two circular walls projecting outward which forms a chamber for an outward projecting inner circular piston wall.

17. A double internal combustion engine of the rotary-reciprocal type comprising, a housing formed with a peripheral wall with side walls which contains a cylindrical inner wall attached to both of said side walls at 90 degree, inner surface of said peripheral walls being cylindrical, two peripheral circular pistons having anterior peripheral located equally spaced wave shaped side walls with the first portion of the wave from the crest of the wave to the trough of the wave being longer than the second portion of the wave from the trough of the wave to the crest of the wave, both pistons are rotatably and reciprocal mounted in said housing, a rotor, having means for the said two piston to reciprocate on and rotate with said rotor, said rotor is attached to a shaft, said shaft extending through said side walls and rotates with said rotor, said housing having two lateral and peripheral circular cylinder chamber having equally spaced arcuate recesses with the inner surface of the said arcuate recesses from the minimum recessed area to the maximum recessed area is a longer distance than the distance from the maximum recessed area to the minimum recessed area of said arcuate recesses, said arcuate recesses extending into said cylinder chamber's side walls, the number and shape of recesses being equal to the number and shape of the waves on the piston's anterior side walls and the number being 2 or more on each piston, one piston's waves are movably mounted in each of said arcuate recesses respectively of one side wall, the other piston's waves are movably mounted with the crest of the waves being opposite to the maximum arcuate recessed area of the other side wall, both piston's peripheral and inner circular surface remaining in sealing contact with the inner peripheral wall, the peripheral surface of the circular inner walls at all times and any seal on the crest of the wave of the pistons remaining in sealing contact with the inner wall's peripheral surface, peripheral housing walls' inner surface and arcuate recesses of said side walls and forming variable volume cylinder chambers between the pistons' waved side wall and said cylinder chamber walls, said housing being provided with means to admitting a gaseous mixture communicating with said cylinder chambers of both engine, means to discharge combustion products communicating with both said cylinder chambers, ignition means communicating with both said cylinder chambers, means to guide both pistons' rotary and reciprocal motions in said housing, both said cylinder chamber of varying sizes enabling a compression of a gaseous mixture to take place after suction, ignition of said compressed gaseous mixture and expansion of said cylinder chambers due to the pressure of said combustion products.

18. The engine according to claim 13, wherein the anterior wall of the housing has two circular walls projecting outward which forms a chamber for an outward projecting inner circular piston wall.

19. The double engine of claim 17 wherein the engines having a cycle of two strokes, compression and expansion wherein exhaust and intake takes place at the end of the expansion stroke.

20. The double engine of claim 17 wherein the engines having a cycle which includes the four strokes of intake, compression, expansion and exhaustion.

21. The double engine of claim 17 wherein the rotor and pistons has means for admitting compressed air from the anterior compression chambers to the cylinder chambers and wherein the combustible fuel is injected directly into the cylinder chambers containing compressed air after the compression stroke and before ignition by means of a direct injection system.

22. The double engine of claim 17 wherein the peripheral wall of said housing provided with exhaust ports for the bilateral cylinder chambers extending therethrough and the bilateral circular inner walls of said housing is provided with intake ports extending therethrough, said port being adapted to be opened or closed by said pistons during rotation and reciprocation and constituting said means for admission of combustion mixture and means for discharging the combustion products.

23. The double engine of claim 17 wherein the arcuate recessed side walls of said housing is provided with exhaust ports extending therethrough and is provided with intake ports extending therethrough, said ports being adapted to be opened or closed by said pistons during rotation and reciprocation and constituting said means for admission of combustion mixture and means for discharging the combustion products.

* * * * *